United States Patent [19]

Alasia

[11] Patent Number: 5,708,717
[45] Date of Patent: Jan. 13, 1998

[54] DIGITAL ANTI-COUNTERFEITING SOFTWARE METHOD AND APPARATUS

[76] Inventor: Alfred Alasia, 9720 Pine Mill Ct., Lake Worth, Fla. 33467

[21] Appl. No.: 564,664

[22] Filed: Nov. 29, 1995

[51] Int. Cl.⁶ .............. G09C 5/00; B42D 15/00; H04L 9/00
[52] U.S. Cl. .............. 380/51; 380/9; 380/49; 380/54; 380/55; 283/72; 283/73; 283/85; 283/93; 283/17; 283/57; 283/58
[58] Field of Search .............. 380/7, 9, 10, 49, 380/50, 51, 54, 55, 59, 23, 25; 340/825.31, 825.34; 283/72, 73, 74, 85, 86, 93, 17, 57, 58, 59

[56] References Cited

U.S. PATENT DOCUMENTS

| | | | |
|---|---|---|---|
| 3,784,289 | 1/1974 | Wicker | 380/54 X |
| 3,937,565 | 2/1976 | Alasia . | |
| 5,027,401 | 6/1991 | Soltesz | 380/54 |
| 5,303,370 | 4/1994 | Brosh et al. | 380/51 |
| 5,396,559 | 3/1995 | McGrew | 380/54 |

*Primary Examiner*—Bernarr E. Gregory
*Attorney, Agent, or Firm*—McHale & Slavin

[57] ABSTRACT

This invention relates generally to a method and apparatus, as implemented by a software program on a computer system, for digitally producing counterfeit-deterring scrambled or coded indicia images, typically in a printed form. This method and system are capable of combining a source image with a latent image so the scrambled latent image is visible only when viewed through a special decoder lens. The digital processing allows different latent images to be encoded according to different parameters. Additionally, latent images might be encoded into single component colors of an original visible image, at various angles from each other.

14 Claims, 25 Drawing Sheets

One Phase SI

Slicing the output image.
The width of the slice depends on the decoder lens' frequency.

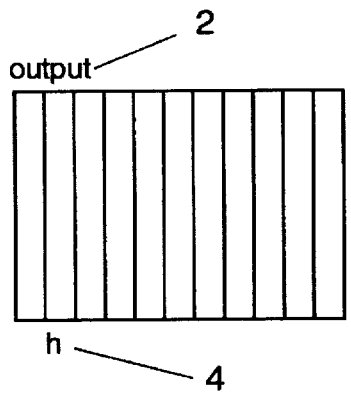

The frequency of- 6
D-7X    =177 line/inch
D-7     =152.5 line/inch
D-6     =134 line/inch
D-9     = 69 line/inch if the 'x2' option is on, it means that the frequency will duplicate.

Inside of every slice the process is the same.

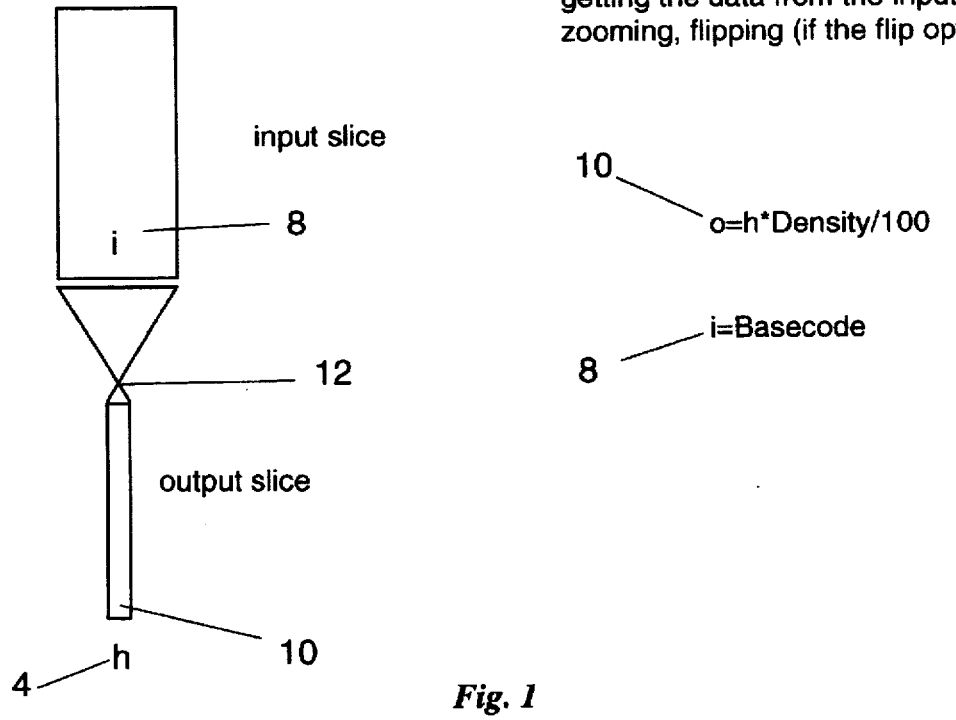

The process is the following:
getting the data from the input slice, zooming, flipping (if the flip option is on)

o=h*Density/100 i=Basecode

*Fig. 1*

Elements of the S.I. Image are Flipped.

Elements of the S.I. Image are not Flipped.

Enlarged 400%

Enlarged 400%

(A)

(B)

Two phase SI

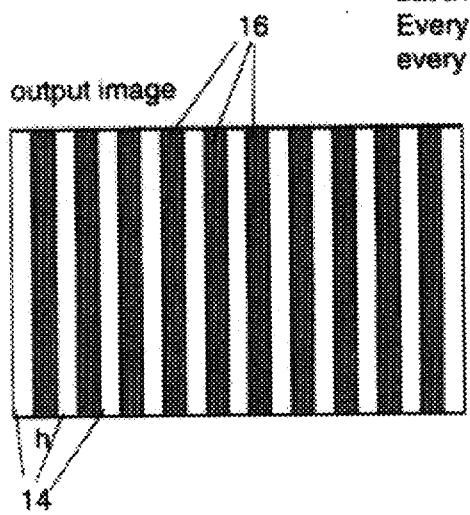

The method is similar to that of the One Phase SI, but the width of the slice is half of the One Phase SI. Every odd slice input is 'source one' file, every even slice is 'source two' file

*Fig. 3*

The process inside slice is the same to that of the One Phase SI.

Three Phase SI

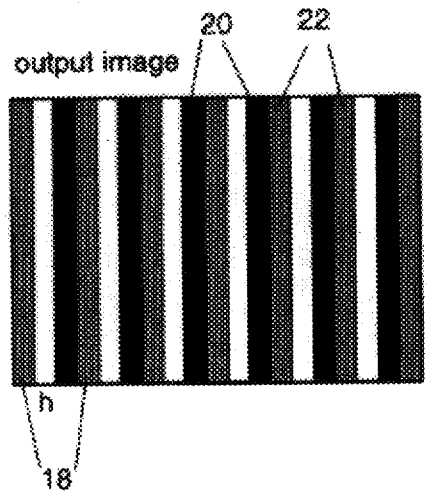

The method is similar to that of the Two Phase SI, but the width of slice is one third of the One Phase SI. Every third slice input is the same.

*Fig. 4*

The inside slice process is the same as that of the One Phase SI.

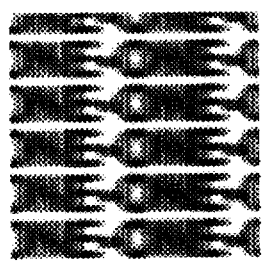 One Phase
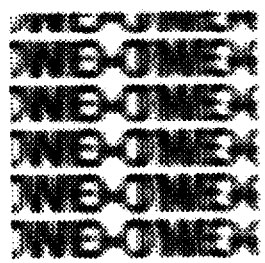 TwoPhase
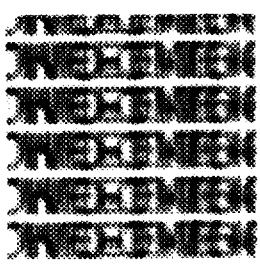 Three Phase
*Fig. 5*

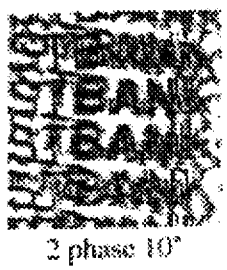
2 phase 10°
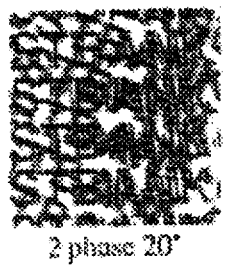
2 phase 20°
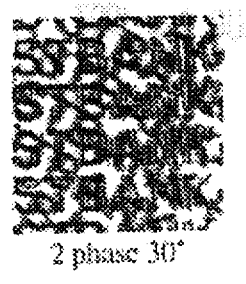
2 phase 30°
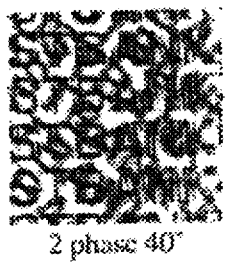
2 phase 40°
2 phase 50°
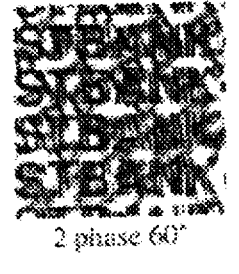
2 phase 60°
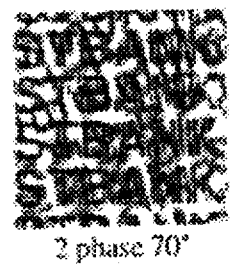
2 phase 70°
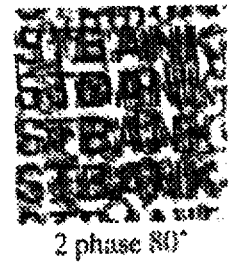
2 phase 80°
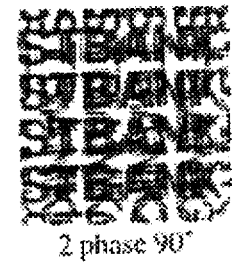
2 phase 90°
*Fig. 8*

We assume at this point that your software has been installed and your user logins have all been created.
Let's say your user name is Tom so you login as Tom. From your desktop you would double click on the SIS button, and if all is right ,you would see the following display

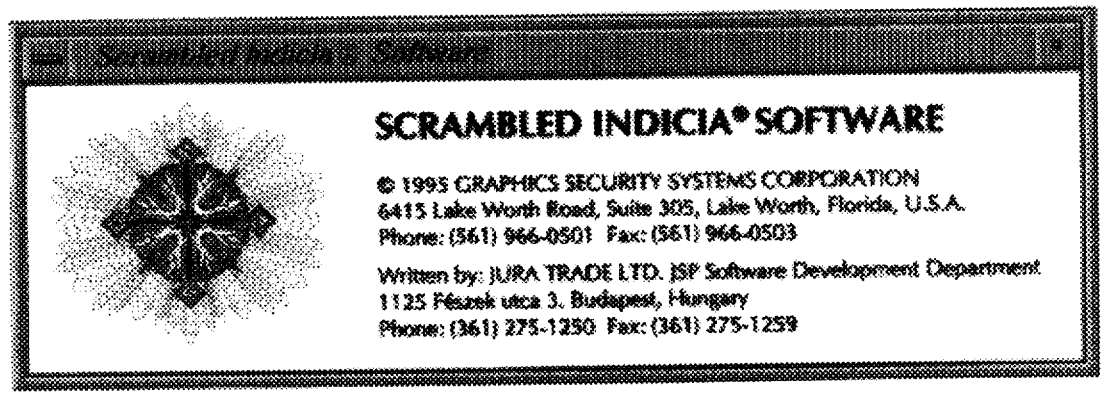

At this point you would click on the OK button and you would get a rectangular box which you can position by moving the mouse. Once you press the mouse button,the following screen would appear.

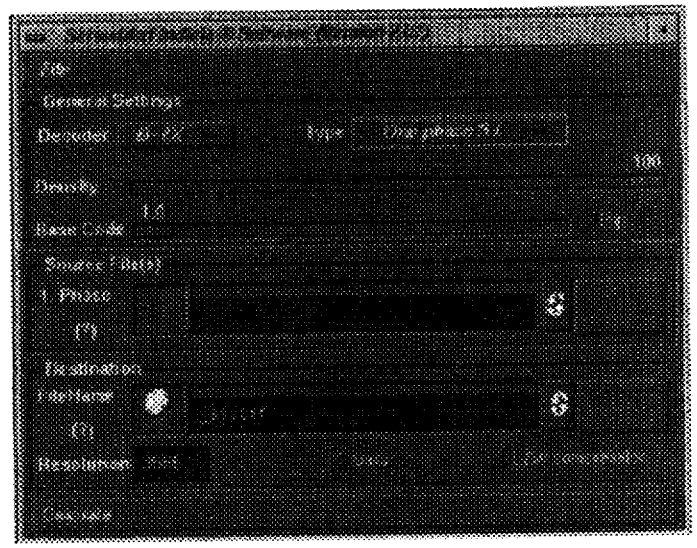

*Fig. 13*

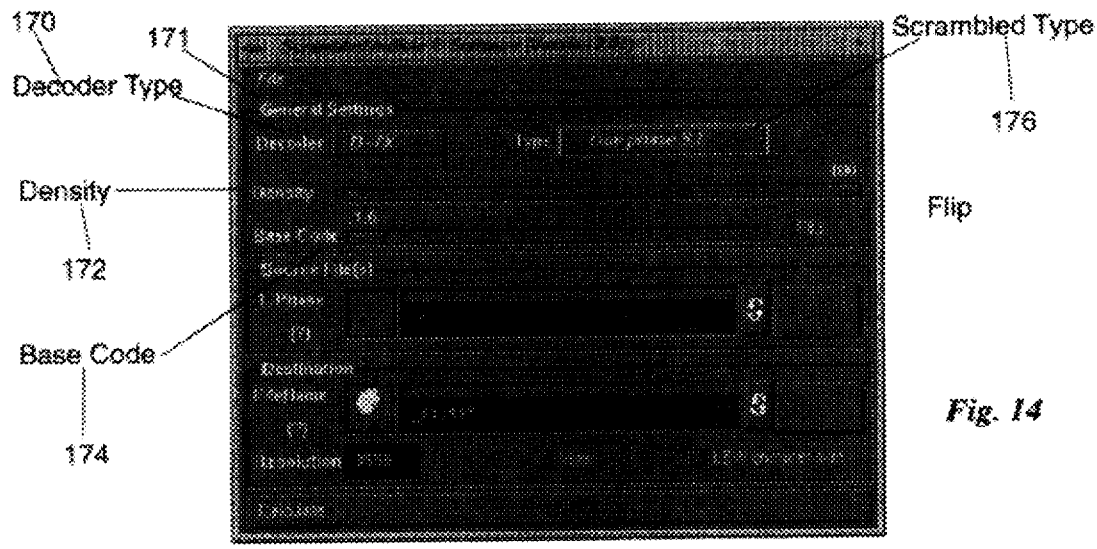

*Fig. 14*

The next series of buttons allow you to select different values that actually determine the kind of "Scrambled Indicia" output you will create.

The option box DECODER allows you to select the type of decoder lens that will be able to unscramble the finished image. Depending on your licensed version, you may have different choices than we show in this example.

The option box TYPE allows you to select the type of scramble. Again, as in the Decoder option, the selections you have installed in the Type Box will depend on your licensing agreement with GSSC.

i.e. (One phase S.I., Two phase S.I., Hidden Image S.I., etc.)

The slider bar DENSITY allows you to control the line weight of the image that is created during the encoding process. This feature will effect both the positive and negative space of the object being encoded. This value can be adjusted based upon what you are encoding and what the final print destination will be.

The slider bar BASE CODE allows you to control the amount of scramble that is applied during the encoding stage.

The FLIP check box will allow you to turn each individual scramble element with a vertical 180 degree move. This option helps hide the original item when that item is of a simple enough nature to see even after the scramble. Sometimes, when scrambling a single word of a few characters, you can still see the letters. This option will create a deeper scramble.

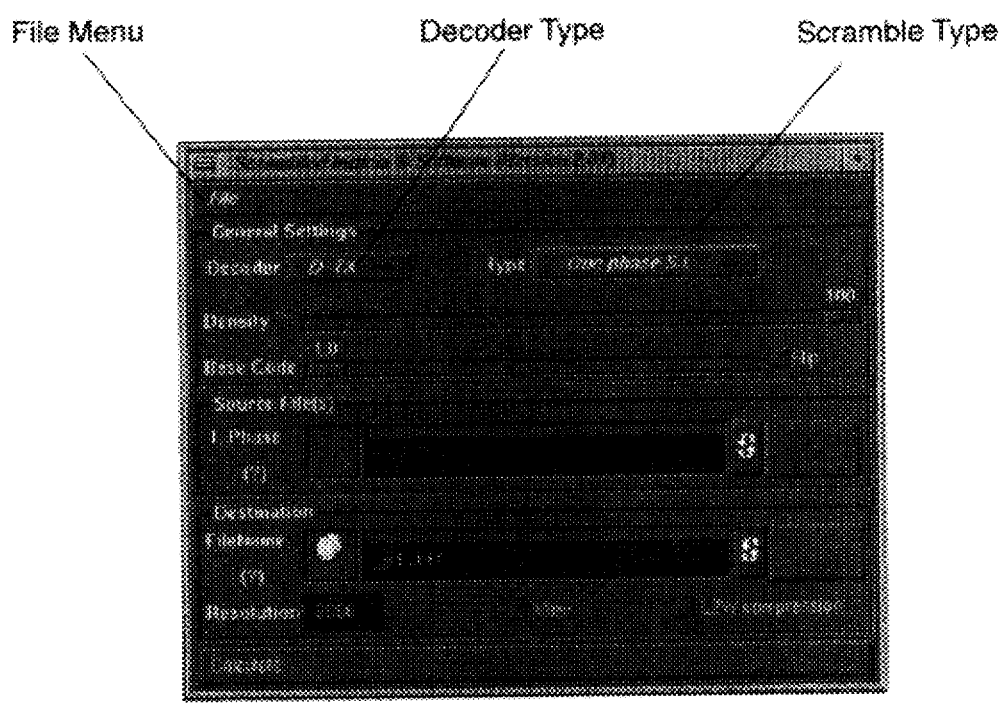

The user interface for the SIS is based upon the X window environment. It is similar to most GUI (Graphical User Interfaces). When you move your mouse pointer to a choice field and hold a mouse button down you will get a pop down or pop-up window. This window will allow you to make more choices.
When you click on the File Menu choice, you will see:

*Fig. 14A*

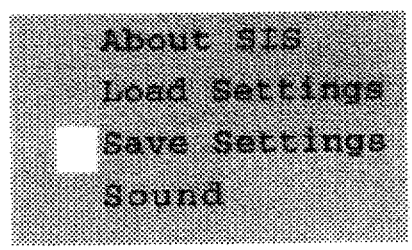

ABOUT SIS will show you the opening banner again.

LOAD SETTINGS allows you to reload specific defaults you may have created for certain jobs.

SAVE SETTINGS allows you to save specific defaults you may have created for certain jobs.

Both LOAD & SAVE will bring up another window which will be covered next.

SOUND- this choice has a radio button. If it is checked, it's ON. If not, it's OFF. SIS will talk to you to let you know what's going on. If you do not want the system talking to you, click the option box ON.

QUIT This option is obvious. It will return you to your desktop. It may also be chosen by using the keystroke combination of Alt-Q which means while holding down the Alternate Key, you also press the letter "Q".

LOAD/SLAVE
When you choose either load or save from the file menu, you will see the following screen appear:

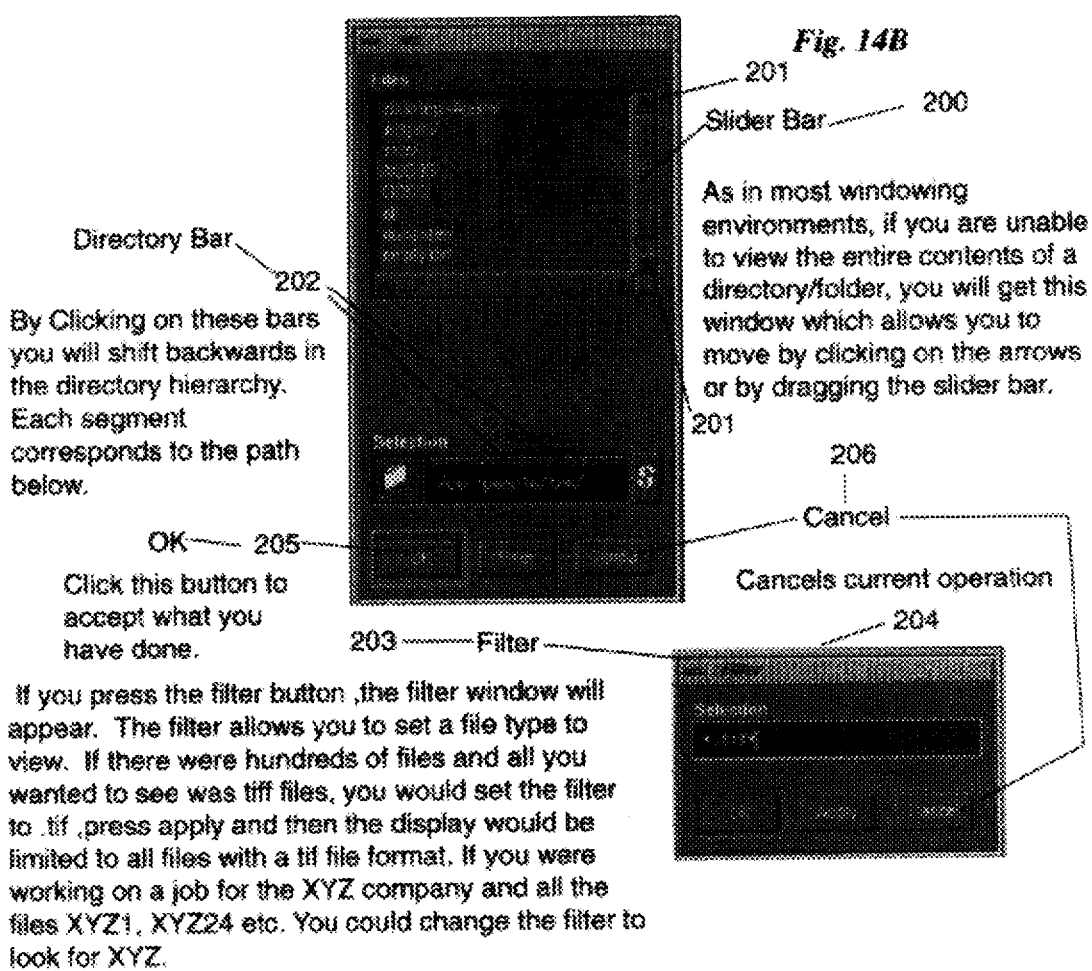

*Fig. 14B*

201 — Slider Bar — 200

As in most windowing environments, if you are unable to view the entire contents of a directory/folder, you will get this window which allows you to move by clicking on the arrows or by dragging the slider bar.

Directory Bar — 202
By Clicking on these bars you will shift backwards in the directory hierarchy. Each segment corresponds to the path below.

OK — 205
Click this button to accept what you have done.

203 — Filter

206 — Cancel
Cancels current operation
204

If you press the filter button, the filter window will appear. The filter allows you to set a file type to view. If there were hundreds of files and all you wanted to see was tiff files, you would set the filter to .tif, press apply and then the display would be limited to all files with a tif file format. If you were working on a job for the XYZ company and all the files XYZ1, XYZ24 etc. You could change the filter to look for XYZ.

Now that we have discussed the different areas of the interface. We will show the different screens for the different types of Scrambled Indicia. In all of the different screens the option boxes and slider bars all behave the same as in the Interface Basics opening. Dependent on the type of Scramble selected, you may have more choices, but the interface will use the same concepts as previously covered. Remember that your specific version of the software may not have all of these options.

SCRAMBLED INDICIA TYPES:

*One Phase S.I.* : This is the type that we used in our interface basics. In One phase S.I. we are dealing with a single element to be scrambled. So as the source and destination box display there is only one choice for the source file. (The source file is the file that will be scrambled)

*Two Phase S.I.* : This type is similar to one phase except that now we can introduce two different elements to be scrambled. You will see that the source file options box changes to reflect this. There is another option that appears when you switch to a multi-phase scramble. This option box appear next to the Type Selection Box and looks like a chain link. This option is called the Restraint Option. When this option is selected, the Base Code control will be adjusted to the same value on both elements. If you deselect the Restraint Option you will be allowed to set a different Base Code for each element. This is useful when you want to overlay two different sets of text that you want to be viewed together, yet be seen as separate words.

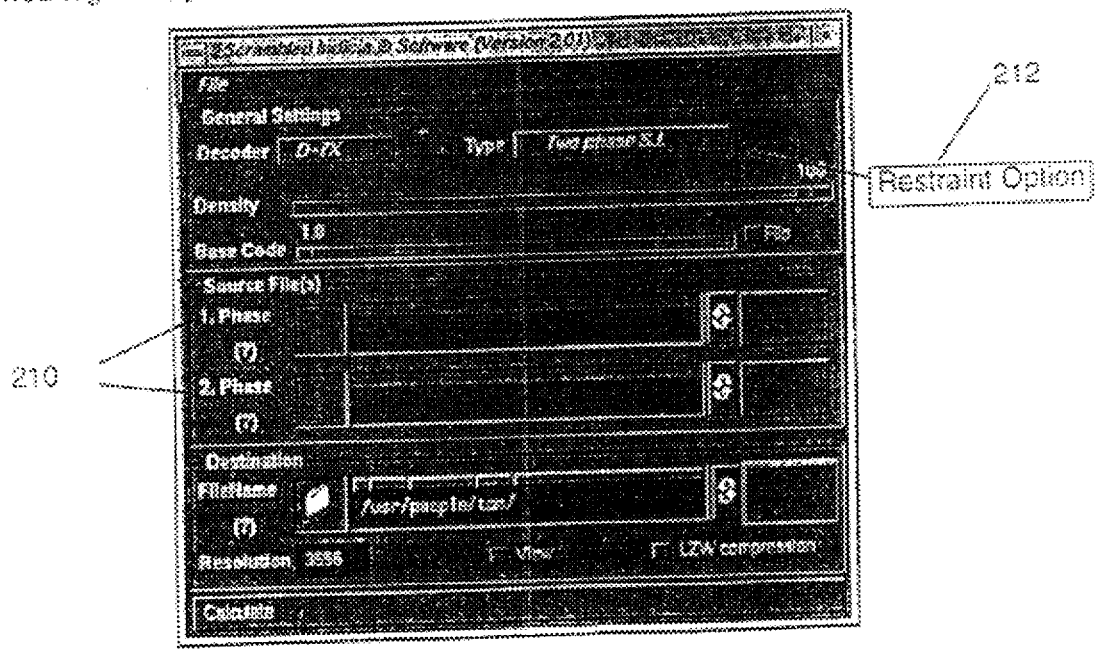

*Fig. 16*

*Three Phase S.I.* : This option is identical to the above but now you can work with three source files. The Constraint Option is also available.

*Indicia Tint S.I.* : Unlike Hidden Image S.I. the Indicia Tint S.I. will flow as smoothly as possible through the image, ignoring the tonal variations. We could almost say it's a monotone scramble of an image. In Hidden Image S.I. you will have an additional field which allows you to compensate for image Offset.

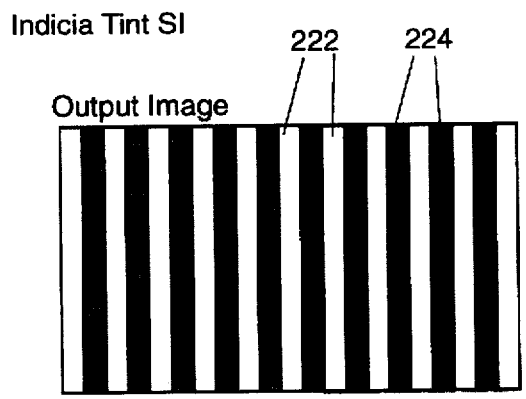

Indicia Tint SI  222  224
Output Image

*Fig. 18A*

The method is similar to that of the Two Phase SI, but only one input file exists, every second slice input is the complementer of the input slice.

The complementer means for example when the input is black, the complementer is white. If the input is red, the complementer is cyan...

The process inside of the slice is the same as that of the One Phase SI.

The Hidden SI is the same, but the output background is a picture instead of white. The first step is to copy the visible image to the output image. After this the method is the same as in the case of Indicia Tint. The density parameter controls the visibility of the image.

The SI raster is similar to that of the indicia tint, but the density controlled by the second input file. If the value from the second input file is dark, the density will be high.

The Multilevel SI is similar to that of the One Phase SI, but the value of BaseCode is controlled by the second input file.

The Hidden SI is the same, but the output background is a picture instead of white. The first step is to copy the visible image to the output image. After this the method is the same as in the case of Indicia Tint. The density parameter controls the visibility of the image.

*Multilevel S.I.:* Multilevel S.I. creates a scrambled image that contains a sense of depth perception. This type of scramble allows you to set both a minimum and maximum BaseCode. This version uses two images, one element called the Texture Surface and an additional element called the Depth. During encoding the tonal values of the depth element will cause a scrambling variant in the Texture Surface element. This variant will give the illusion of depth.

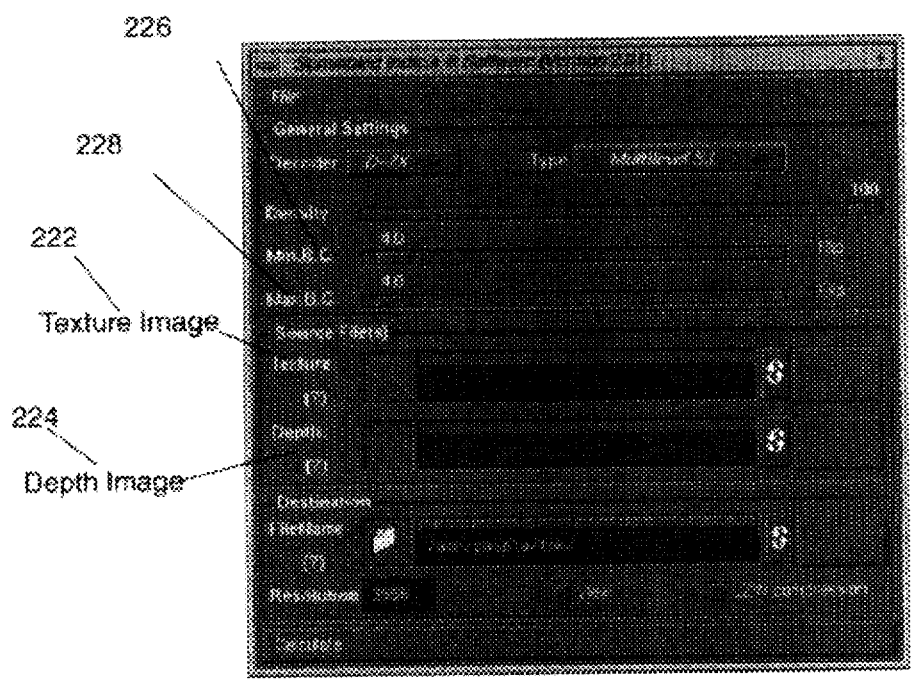

*Fig. 20*

S.I. Raster: The Scrambled Indicia Raster allows you to mix two images together where one of the images becomes latent to the other which is visible. The latent image will interlace with the visible image following the grey scale values of that image. This effect will allow the latent image to be visible only when viewed through a decoder.

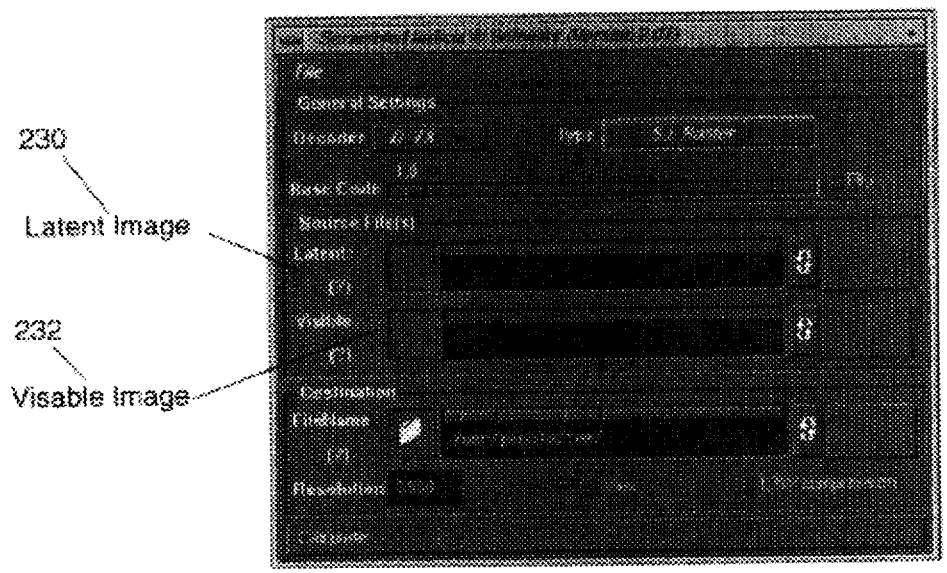

230 — Latent Image

232 — Visable Image

*Fig. 21*

DIGITAL ANTI-COUNTERFEITING SOFTWARE METHOD AND APPARATUS

FIELD OF THE INVENTION

This invention relates generally to a method and apparatus, as implemented by a software program on a computer system, for producing counterfeit-deterring scrambled or coded indicia images, typically in a printed form. This method and system are capable of combining a source image with a latent image so the latent image is visible only when viewed through a special decoder lens.

BACKGROUND INFORMATION

To prevent unauthorized duplication or alteration of documents, frequently there is special indicia or a background pattern provided for sheet materials such as tickets, checks, currency, and the like. The indicia or background pattern is imposed upon the sheet material usually by some type of printing process such as offset printing, lithography, letterpress or other like mechanical systems, by a variety of photographic methods, by xeroprinting, and a host of other methods. The pattern or indicia may be produced with ordinary inks, from special inks which may be magnetic, fluorescent, or the like, from powders which may be baked on, from light sensitive materials such as silver salts or azo dyes, and the like. Most of these patterns placed on sheet materials depend upon complexity and resolution to avoid ready duplication. Consequently, they add an increment of cost to the sheet material without being fully effective in many instances in providing the desired protection from unauthorized duplication or alteration.

Various methods of counterfeit-deterrent strategies have been suggested including Moire-inducing line structures, variable-sized dot patterns, latent images, see-throughs, barcodes, and diffraction based holograms. However, none of these methods employs a true scrambled image or the added security benefits deriving therefrom.

This same inventor earlier disclosed a novel system for coding and decoding indicia on printed matter by producing a parallax panoramagram image. These principles and embodiments of U.S. Pat. No. 3,937,565, issued Feb. 10, 1976 are hereby incorporated by reference. The indicia were preferably produced photographically using a lenticular line screen (i.e. a lenticular screen) with a known spatial lens density (e.g. 69 lines per inch). A specialized autostereoscopic camera might be used to produce the parallax image such as the one described in this inventor's U.S. Pat. No. 3,524,395, issued Aug. 18, 1970, and U.S. Pat. No. 3,769,890, issued Nov. 6, 1973.

Photographic, or analog, production of coded indicia images has the drawback of requiring a specialized camera. Also, the analog images are limited in their versatility in that an area of scrambled indicia is generally noticeable when surrounded by non-scrambled images. Also, it is difficult to combine several latent images, with potentially different scrambling parameters, due to the inability to effectively re-expose film segments in generating the scrambled, photographic image.

Accordingly, a method and apparatus are needed whereby the photographic process and its results are essentially simulated digitally via a computer system and related software. Additionally, a system is needed whereby scrambled latent images can be integrated into a source image, or individual color components thereof, so that the source image is visible to the unaided eye and the latent image is visible only upon decoding. Also needed is the ability to incorporate multiple latent images, representing different "phases", into the source image for added security.

SUMMARY OF THE INVENTION

The present invention provides a software method and apparatus for digitally scrambling and incorporating latent images into a source image. The latent image—in digitized form—can be scrambled for decoding by a variety of lenticular lenses as selected by the user, with each lens having different optical properties such as different line densities per inch, and/or a different radius of curvature for the lenticulas. Different degrees of scrambling might also be selected wherein the latent image is divided up into a higher multiplicity of lines or elements. For decoding purposes, the multiplicity of elements would be a function of the lens density.

The source image is then rasterized, or divided up into a series of lines equal in number to the lines making up the scrambled latent images. Generally, when hard copy images are printed, the image is made up of a series of "printers dots" which vary in density according to the colors found in the various component parts of the image. The software method and apparatus of the present invention, takes the rasterized lines of the source image and reforms them into the same general pattern as the lines of the scrambled latent image. Hence, where the source image is darker, the scrambled lines are formed proportionately thicker; where the source image is lighter, the scrambled lines are formed proportionately thinner. The resulting combined image appears to the unaided eye like the original source image. However, since the component rasterized lines are formed in the coded pattern of the scrambled latent image, a decoder will reveal the underlying latent image. Due to the high printing resolution needed for such complex scrambled lines, attempts to copy the printed image by electromechanical means, or otherwise, are most often unsuccessful in reproducing the underlying latent image.

As a result of this digital approach, several different latent images can be scrambled and combined into an overall latent image, which can then be reformed into the rasterized source image. This is achieved by dividing the rasterized lines into the appropriate number of images (or phases) and interlacing the phased images in each raster line element. Each individual latent image might be oriented at any angle and scrambled to a different degree, so long as the scrambling of each image is a functional multiple of the known decoder frequency. Alternatively, the grey scale source image might be divided up into primary component printing colors (e.g. cyan, magenta, yellow, and black, or CMYK; red, green, blue, or RGB). Single color bitmap formats might also be used for certain applications. A scrambled latent image, or a multi-phased image, could then be individually reformed into each component color. Upon rejoining of the colors to form the final source image, the decoder will reveal the different latent images hidden in the different color segments.

The present invention also allows the option of flipping each of the elements of the latent image after it has been divided or scrambled into its elemental line parts. As has been discovered by the inventor, this unique step produces relatively sharper decoded images when each of the elements is flipped about its axis by one-hundred and eighty (180) degrees. This same effect was achieved by the process of U.S. Pat. No. 3,937,565, and the cited stereographic cameras therein, through the inherent flipping of an object when viewed past the focal point of a lens. The flipped elemental lines are then reformed into the rasterized source image. While enhancing the sharpness of the latent image, the flipping of the elements has no adverse, or even noticeable, effect on the appearance of the final coded source image. Moreover, by combining two images consisting of one image where the elements are flipped and another where they are not flipped, the appearance of a spatial separation of the two images will occur upon decoding.

As needed, the source image might simply consist of a solid color tint or a textured background which would contain hidden latent images when viewed through the proper decoder. Such solid, tinted areas might frequently be found on checks, currency, tickets, etc.

Other useful applications might include the latent encoding of a person's signature inside a source image consisting of that person's photograph. Such a technique would make it virtually impossible to produce fake ID's or driver's licenses through the common technique of replacing an existing picture with a false one. Other vital information besides the person's signature (e.g. height, weight, identification number, etc.) might also be included in the latent image for encoding into the source image.

Still other useful applications might include, for example, the following: credit cards, passports, photo-identification cards, currency, special event tickets, stocks and bond certificates, bank and travelers checks, anti-counterfeiting labels (e.g. for designer clothes, drugs, liquors, video tapes, audio CD's, cosmetics, machine parts, and pharmaceuticals), tax and postage stamps, birth certificates, vehicle restoration cards, land deed titles, and visas.

Thus, an objective of the present invention is to provide a counterfeit-deterrent method and apparatus, as implemented by a software program on a computer system, for producing scrambled or coded indicia images, typically in a printed form. The coded image can then be decoded and viewed through a special lens which is matched to the software coding process parameters.

A further objective of the present invention is to provide a counterfeit-deterrent method and apparatus, as implemented by a software program on a computer system, wherein a source image is rasterized, and the latent image is broken up into corresponding elemental lines, and the rasterized source image is reconstructed according to the coded pattern of the scrambled image.

Yet a further objective of the present invention is to provide a counterfeit-deterrent method and apparatus, as implemented by a software program on a computer system, wherein the source image is converted into a grey scale image for incorporation of a latent scrambled image.

Still another objective of the present invention is to provide a counterfeit-deterrent method and apparatus, as implemented by a software program on a computer system, wherein the grey scale source image is further separated out into its component color parts for possible incorporation of latent scrambled images into each component color part, with the parts being rejoined to form the final encoded source image.

A related objective of the present invention is to provide a counterfeit-deterrent method and apparatus, as implemented by a software program on a computer system, wherein the elemental lines of the scrambled image may be rotated or flipped about their axis as necessary, or as selected by the user.

A further objective of the present invention is to provide a counterfeit-deterrent method and apparatus, as implemented by a software program on a computer system, wherein the "single phased" the scrambled image consists of a first latent image which has been sliced and scrambled as a function of a user selected decoder density and scrambling factor.

Yet another objective of the present invention is to provide a counterfeit-deterrent method and apparatus, as implemented by a software program on a computer system, wherein the "two phased" scrambled image is sliced as a function of a user selected decoder density, and each slice is halved into two sub-slices, and the first and second latent images are alternately interlaced in the sub-slices, with each latent image scrambled by a user selected scrambling factor.

Still another objective of the present invention is to provide a counterfeit-deterrent method and apparatus, as implemented by a software program on a computer system, wherein the "three phased" scrambled image is sliced as a function of a user selected decoder density, and each slice is divided into three sub-slices, and the first, second, and third latent images are alternately interlaced in the sub-slices, with each latent image scrambled by a user selected scrambling factor.

Yet another objective of the present invention is to provide a counterfeit-deterrent method and apparatus, as implemented by a software program on a computer system, wherein an "indicia tint" is produced which is similar to a two phased SI, but with one source file, and every second sub-slice of the input image is the complimenter of the first sub-slice.

A further objective of the present invention is to provide a counterfeit-deterrent method and apparatus, as implemented by a software program on a computer system, wherein the source image consists of a solid color or tint pattern with the scrambled image incorporated therein, but the elemental lines are flipped only where a letter or object occurs in underlying latent image.

Still another objective of the present invention is to provide a counterfeit-deterrent method and apparatus, as implemented by a software program on a computer system, wherein the latent image is encoded directly into a certain visible figure on the source image, thus creating a "hidden image" effect.

Yet another objective of the present invention is to provide a counterfeit-deterrent method and apparatus, as implemented by a software program on a computer system, wherein a bitmap source image is used (instead of a grey scale image) to create hidden images behind single color source images or sections of source images.

Still another related objective of the present invention is to provide a counterfeit-deterrent method and apparatus, as implemented by a software program on a computer system, wherein a multilevel, 3-dimensional relief effect is created by applying different scrambling parameters to an image and its background.

Another related objective of the present invention is to provide a counterfeit-deterrent method and apparatus, as implemented by a software program on a computer system, wherein "void tint" sections might be produced and the word "void," or similar such words, would appear across documents if attempts are made to photocopy them.

Yet another possible objective of the present invention is to use the software program and computer system to produce the equivalent of "water marks" on paper products.

Still another possible objective of the present invention is to use the software program and computer system to produce, or to aid in producing, holographic images through line diffraction techniques.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

FIG. 1 shows a "one phase" example of the Scrambled Indicia (SI) process wherein an output image is sliced into elements as a function of the frequency of the decoding lens and the scrambling factor (or zoom factor, or base code) as selected by the user.

FIG. 3 shows a "two phase" SI example of slicing the output image, wherein the width of the slice is one half of the one phase example, with every odd slice being from a 'source one' file, and every even slice being from a 'source two' file.

FIG. 4 shows a "three phase" SI example of slicing the output image, wherein the width of the slice is one third of the one phase example, with every third slice being from the same source input file.

FIG. 5 shows a comparison of the one, two, and three phase scrambled and coded results.

FIG. 6 shows a series comparison of scrambled images as a function of increasing lens frequency (or line density per inch) from 10 through 100.

FIG. 7 shows a series comparison of scrambled images as a function of increasing zoom factor (or base code) ranging from 30 through 250, for a given lens frequency.

FIG. 8 shows a series comparison of two phased scrambled images wherein the first latent image and the second latent image are rotated with respect to each other ranging from 10 through 90 degrees.

FIG. 13 the introductory screen for the scrambled indicia software (SIS).

FIG. 14 shows the series of options appearing on the generalized screen for a one phase type SI selection.

FIG. 14(a) shows the choices resulting from clicking on the File Menu option.

FIG. 14(b) shows the resulting screen when either load or save is selected from the File Menu option.

FIG. 16 shows the generalized screen for a two phase type SI selection.

FIG. 18(a) shows an "indicia tint" example of slicing the output image, wherein the width of the slice is one half of the one phase example, with every other sub-slice being the complimenter of the previous sub-slice input.

FIG. 20 shows the generalized screen for a multilevel type SI selection.

FIG. 21 shows the generalized screen for an S.I. Raster type selection.

DETAILED DESCRIPTION OF THE PREFERRED EMBODIMENT

Figure 2:
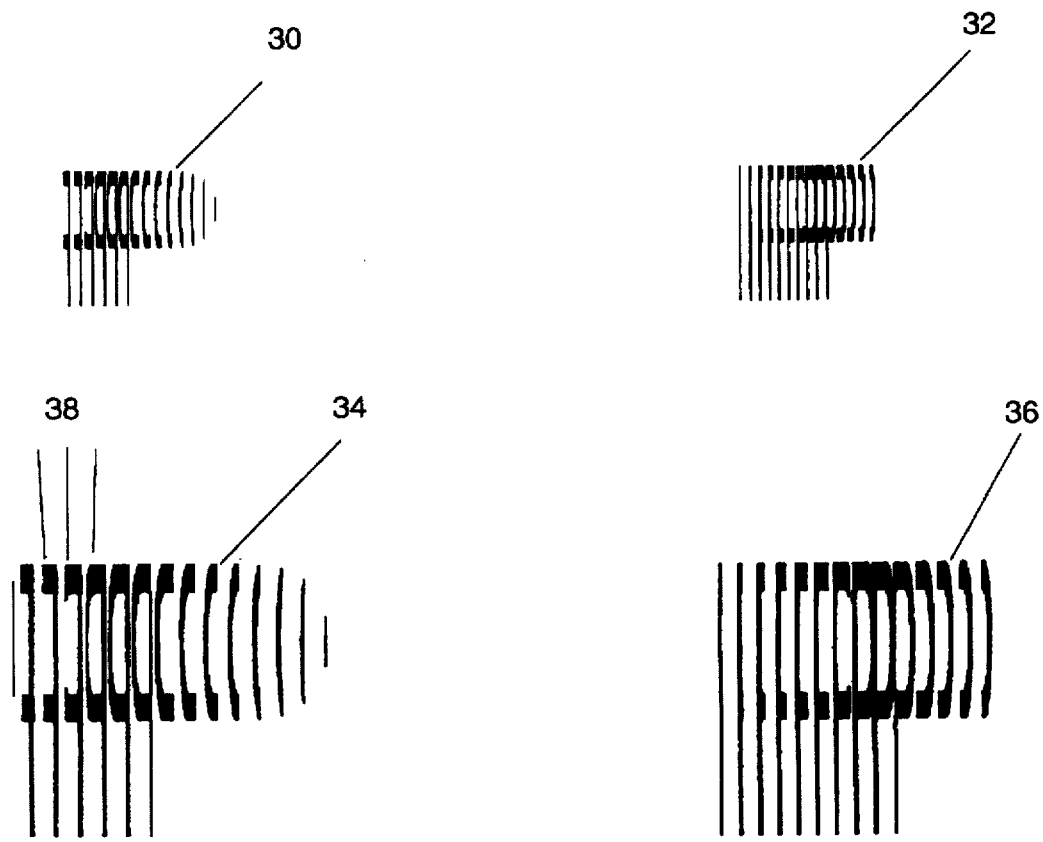
FIG. 2(a) shows a scrambled "P" (above) with its resulting elements enlarged 400% (below) wherein the elements have been flipped 180 degrees about their vertical axes.
FIG. 2(b) shows the scrambled "P" (above) of FIG. 9(a) with its resulting elements enlarged 400% (below) wherein the elements have not been flipped or altered.

Although the invention has been described in terms a specific embodiment with certain alternatives, it will be readily apparent to those skilled in this art that various modifications, rearrangements and substitutions can be made without departing from the spirit of the invention. The scope of the invention is defined by the claims appended hereto.

The Scrambled Indicia (SI) process involves rasterizing, or dividing up into lines, a source or visible image according to the frequency (or density) of a lenticular decoder lens. The number of lines is also a function of the scrambling factor, or zoom factor, as applied to a latent or secondary image. After the latent image is processed and scrambled, a set of scrambled lines exists which can then be combined into the rasterized lines of the visible image. The visible image is thus reformed, or re-rasterized, according to the pattern of the scrambled latent image lines. Where the visible image is darker, the scrambled lines are made proportionately thicker in re-forming the rasterized lines of the visible image; similarly, where the visible image is lighter, the scrambled lines are made proportionately thinner. As a result, a new visible image is created, but with the encoded, latent, SI pattern being visible "underneath" when viewed through a transparent decoder lens.

Referring now to FIG. 1, certain example details of the process are shown. In this example, one latent image is processed into a visible source image, and this process is generally referred to as a "one phase" SI operation. In any SI operation, an output image is a function of the decoder lens density. An output image 2 is shown which is sliced up into elemental slices, or segments, of width h. (See reference 4). Each slice width h is a function of several factors such as density and base code.

As for lens density, the inventor has assigned reference names to lenses with various frequencies (or line densities per inch), including for instance, the following: D-7X with 177 lines/inch; D-7 with 152.5 lines/inch; D-6 with 134 lines/inch; D-9 with 69 lines/inch. (See reference 6). The software for performing this process also provides an "x2" (or doubling factor, df) option which doubles the effective line density, and hence divides the output image up into twice as many slices. The resulting SI image will still be decodable by the selected lens because the number of lines is an even multiple of the frequency of the lens.

The output image slice, having width h, is processed as a function of the input slice width i (see reference 8). In turn, width i is a function of width h, the lens density, and a base code factor (or scrambling factor) as selected by the user. These formulas are as follows:

$df=2$(if "x2" selected); 1 (by default)

$o=h*$density$/100$ (See reference 10)

$i=o*$base code(B) (See reference 8)

Rearranging these formulas, the value for h becomes:

$$h = \frac{(1/B)*100}{\text{Density}*df}$$

Hence, as the value for the base code and/or the density is increased, the width h will decrease. A larger base code, or scrambling factor, therefore creates more lines and results in a more distorted or scrambled image.

Additionally, the SI process allows the option of flipping 12 the input slice to affect the sharpness of the image. Referring now to FIG. 2(a), the letter "P" is shown scrambled 30 according to the S.I. process. An image 34 enlarge by 400% further shows the characteristic elements 38. In this instance the elements have each been individually flipped 180 degrees about their vertical axis. FIG. 2(b) shows the same example "P" 32, and enlarged version 36 where the elements have not been flipped. When viewed through the proper decoder lens for these particular S.I. parameters, the flipped "P" will appear sharper, or more visually distinct, than the unflipped "P". For any scrambled image, the software provides the user the option of flipping or not flipping the elements, as further detailed below.

Referring now to FIG. 3, a "two phase" SI process is shown whereby the method is similar to that for the one phase SI. In this case, however, each slice of width h is further divided into a first and second sub-slice. The elemental lines of first and second scrambled images will be stored by the software program in 'source one' and 'source two' files. In the resulting output image, the odd slices 14 are composed of elemental lines from the source one file, and the even slices 16 are from the source two file. Upon decoding, the first and second scrambled images will appear independently discernable.

Referring now to FIG. 4, a "three phase" SI process is shown as similar to the one and two phase SI processes. In this case, width h is divided into three parts. The first, second, and third scrambled images are stored in three computer source files. In the resulting output image, every third slice 18, 20, and 22 comes from the same respective first, second, or third source file. Again upon decoding, the first, second, and third scrambled images will appear independently discernable.

Figure 6:
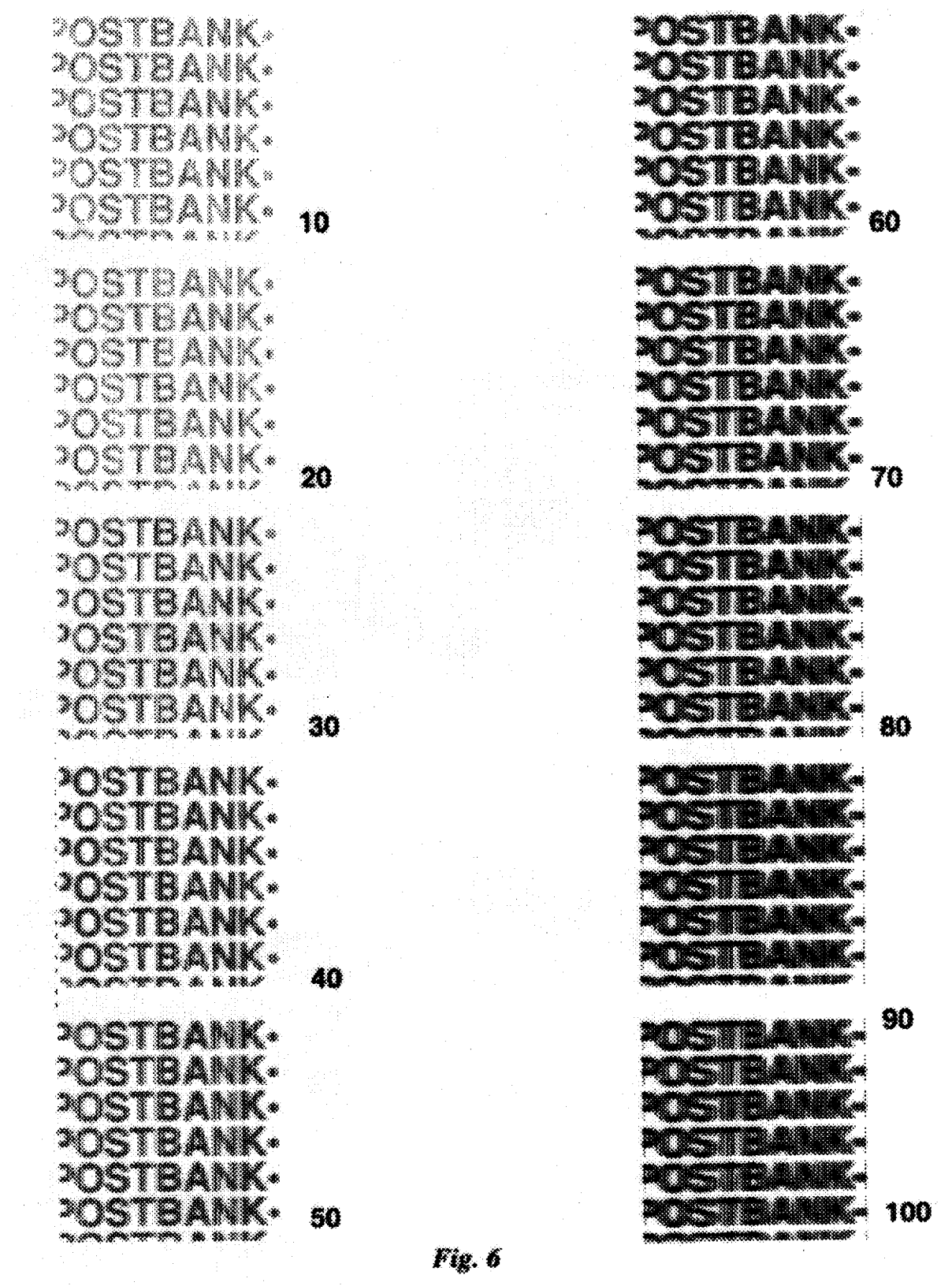
Figure 7:
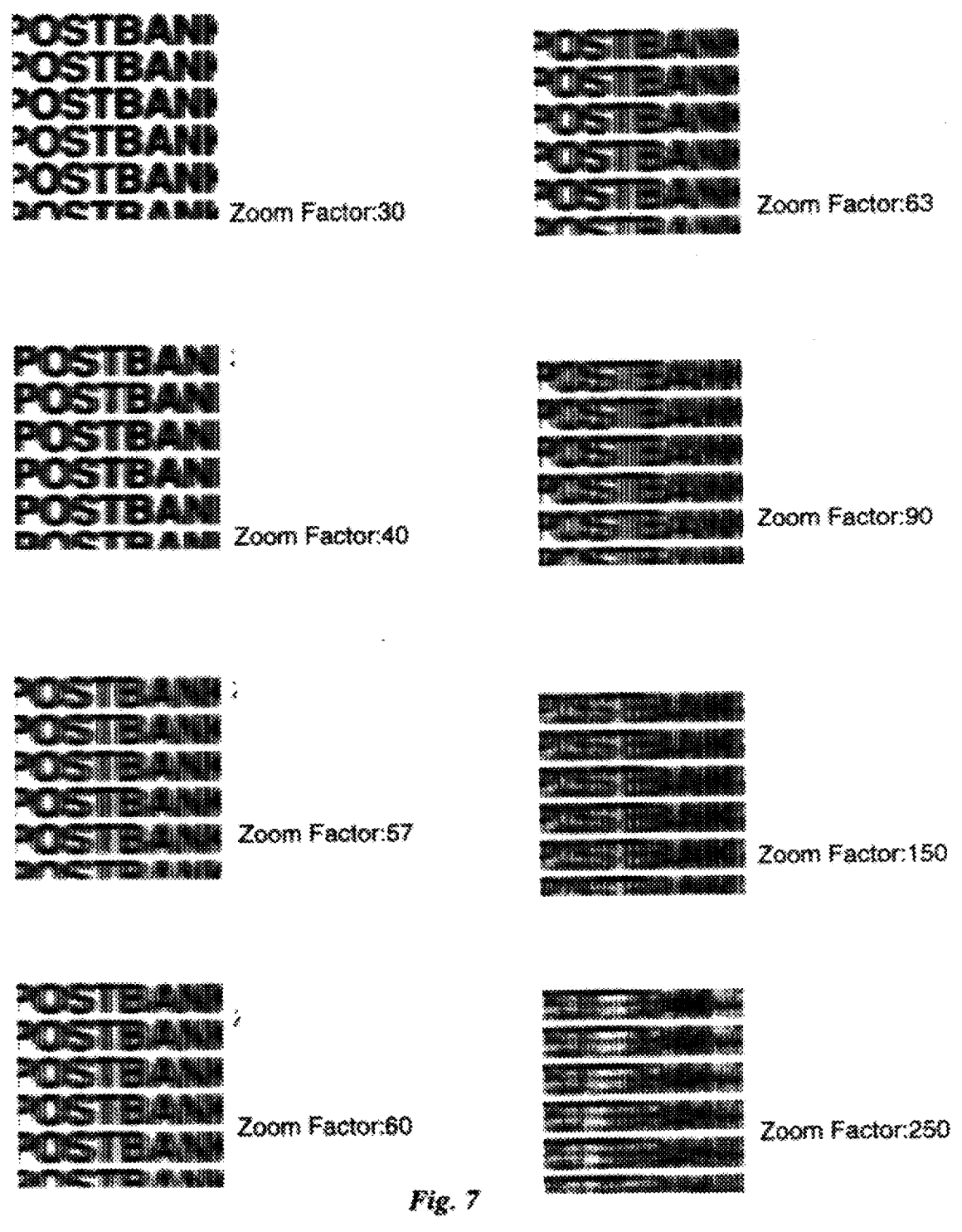

Referring to FIG. 5, a comparison is shown of the one, two, and three phase scrambled results for a given lens density and base code. FIG. 6 shows a comparison of the scrambled results for a given base code and a varying set of lens densities ranging from 10 through 100 lines per inch. As the lens density increases, the relatively width of each elemental line decreases and causes the scrambled image to be harder to discern. In FIG. 7, the lens density is fixed while the zoom factor, or base code, is increased through a series of values ranging from 30–250. Similarly as per the formulas above, as the base code is increased, the relative width of each elemental line decreases and causes the scrambled image to be harder to discern. As shown, the discernability of the scrambled image for a zoom factor of 30 is far greater than for a zoom factor of 250.

Another benefit or feature of multiple phasing is that each latent image can be oriented at a different angle for added security. Referring now to FIG. 8, a series of two phase images is shown where the first latent image remains fixed and the second latent image is rotated, relative to the first image, through a series of angles ranging from 10–90 degrees.

Figure 9:
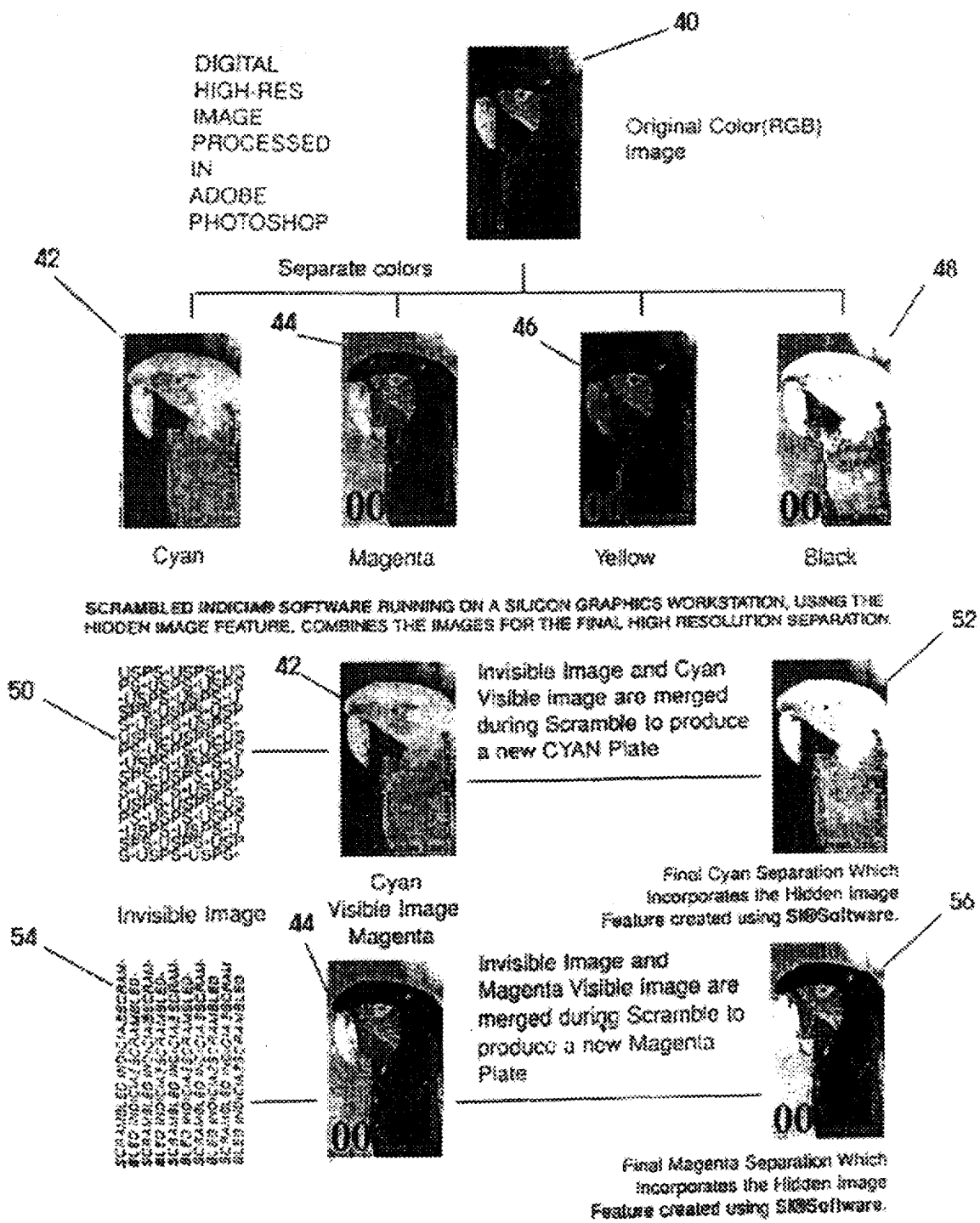
FIG. 9 shows the steps involved to encode, as hidden images, two separate scrambled indicia patterns into two separate base colors as extracted from the original source image.

Referring now to FIG. 9, an example of the versatility offered by a software version of the S.I. process is shown. In this example, a postage stamp is created whereby the S.I. process incorporates two different latent images, oriented 90 degrees to each other, into two different base colors of the visible source image. The visible source image—as comprised of its original RGB colors—is scanned, as a digital high resolution image, into a program such as ADOBE PHOTOSHOP. The image is then divided into its component color "plates" in yet another commonly used color format CMYK, wherein the component images of Cyan 42, Magenta 44, Yellow 46, and Black 48 are shown. The versatility of the S.I. software allows for the easy combination of a latent S.I. image with any one component color of the visible image. In this case, the latent invisible image 50 with the repeated symbol USPS is scrambled and merged with the Cyan color plate 42. The resulting Cyan color plate 52—as described above—will show the original visible image in a rasterized pattern to the unaided eye, but the latent invisible image will be encoded into the rasterized pattern. A second latent invisible image 54 with the repeated trademark SCRAMBLED INDICIA (of this inventor) is merged with the Magenta color plate 44 to produce the encoded Magenta image 56. The final visible image (similar to 40) will then be re-composed using the original Yellow and Black plates along with the encoded Cyan and Magenta plates.

Figure 10:
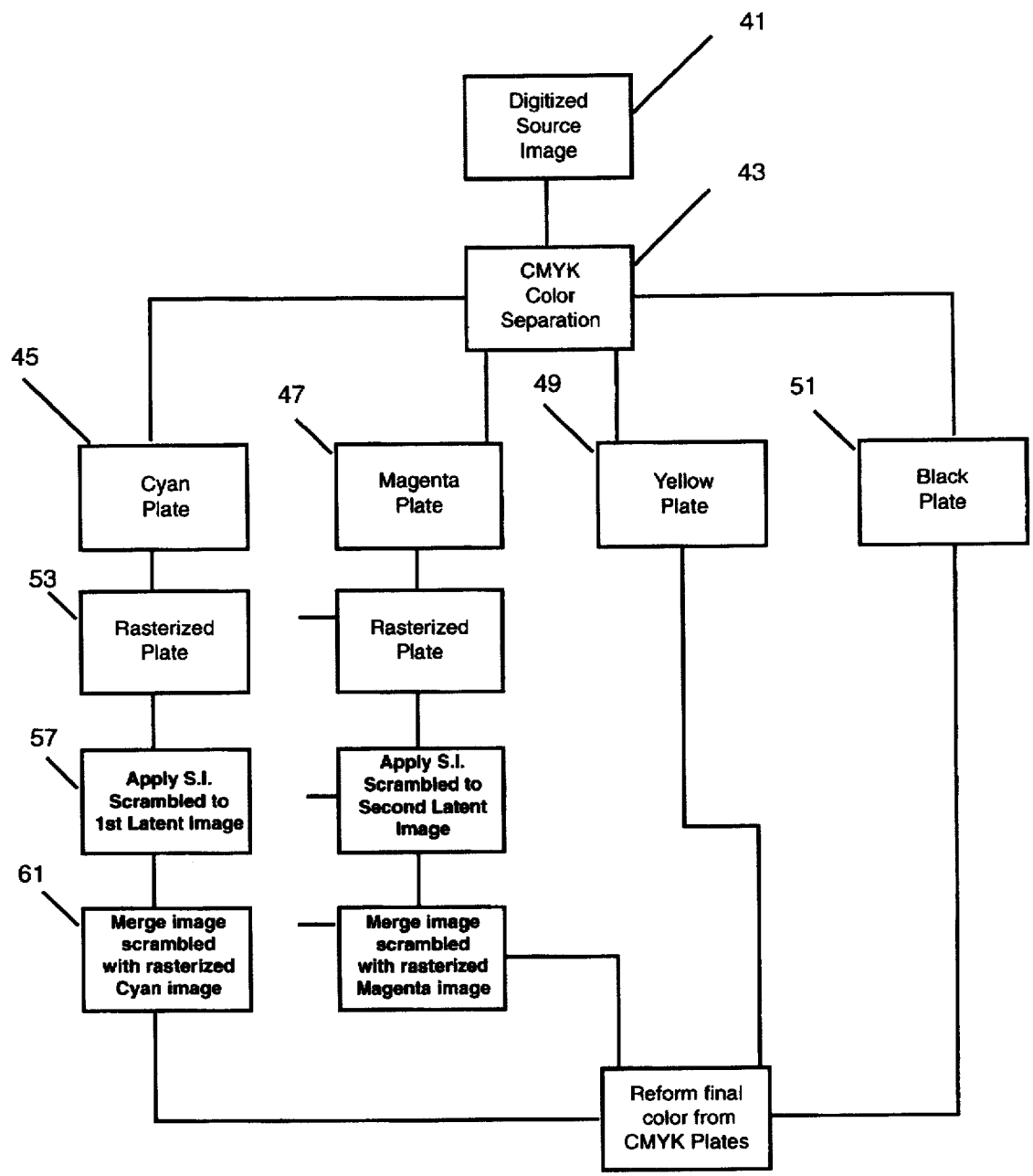
FIG. 10 shows a flow chart of the steps relating to the process as shown in FIG. 9.

Referring now to FIG. 10, an example flow chart of the steps performed by the S.I. software in FIG. 10 are shown. The source image is first digitized 41 and then divided out into its component CMYK colors 43. Each color plate 45, 47, 49, and 51 can be independently operated on by any of the S.I. process implemented. In this case, a hidden image technique (or rasterization in single color) is performed. The target color plates are rasterized 53, 55 and the S.I. scrambling process is applied to the first latent image 57 and the second latent image 59. The first scrambled image is then merged with the rasterized Cyan color plate 61 and the second scrambled image is merged with the rasterized Magenta color plate 63. The final output image is a created by re-joining the encoded Cyan and Magenta color plates with the unaltered Yellow and Black color plates 65. In this example, only the Cyan and Magenta colors were encoded. Other examples might choose to encode one color, three colors, or all four colors.

Figure 11:
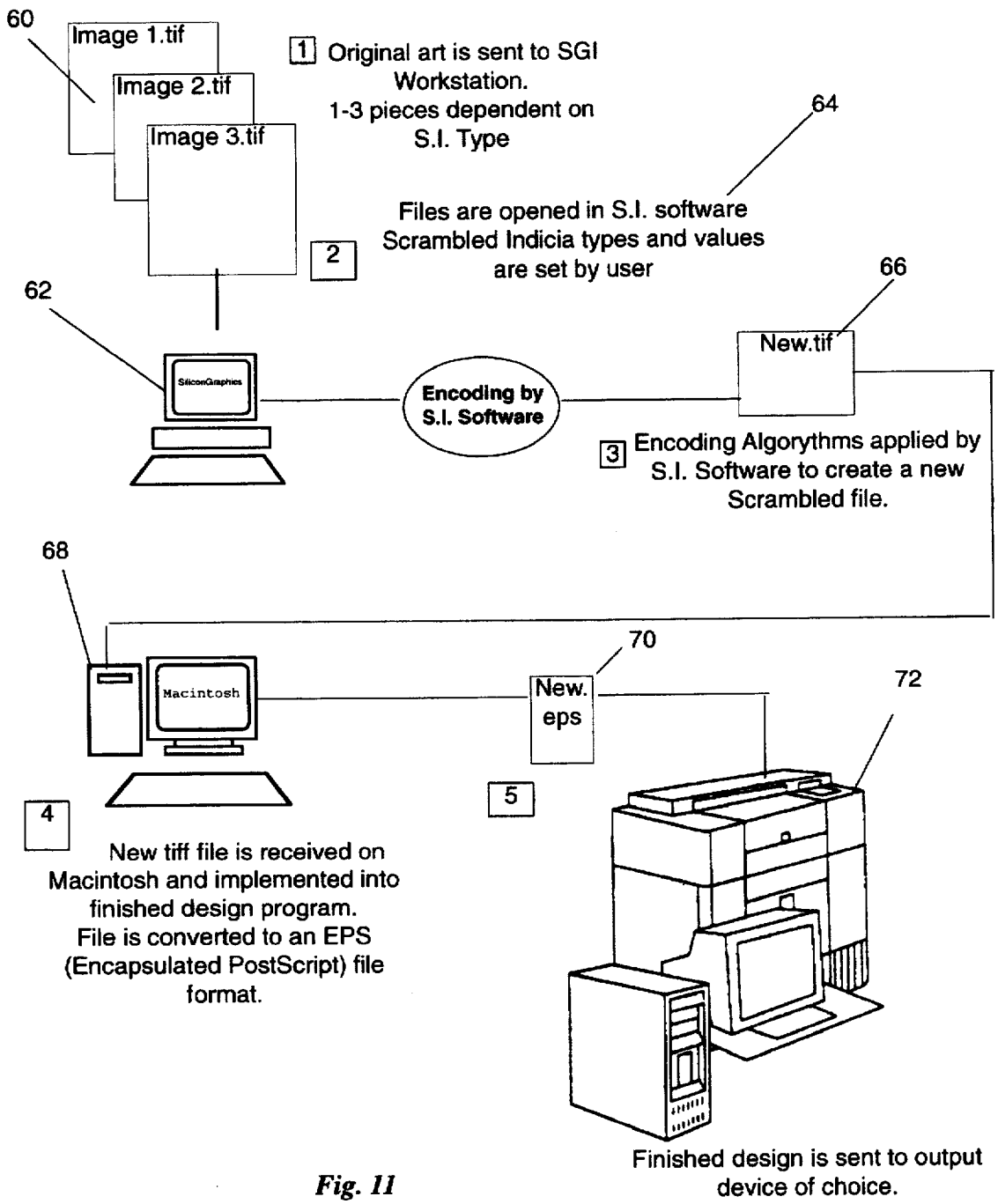
FIG. 11 shows an example hardware configuration for running the S.I. software and performing the SI process.

While this process might be implemented on any computer system, the preferred embodiment uses a setup as shown in FIG. 11. Various image files, as stored in "tif" format 60, are fed into a SILICON GRAPHICS INC. (SGI) workstation 62 which runs the S.I. software. While the software might run on any computer capable of handling high resolution graphics, the SGI machine is used because of its superior speed and graphical abilities. The files are opened by the S.I. software and the scrambled indicia types, values, and parameters are set by the program user 64. Encoding algorithms are applied by the S.I. software to merge latent images with visible images to create a new scrambled "tif" file 66. The new "tif" file is then fed into a MACINTOSH computer 68 for implementation into the final design program, wherein the file is converted into an Encapsulated PostScript (EPS) file format 70. The finished design is then sent to an output device of choice 72 which is capable of printing the final image with the resolution necessary to maintain and reveal the hidden latent images upon decoding. The preferred output device is manufactured by SCITEX DOLVE.

Figure 12A:
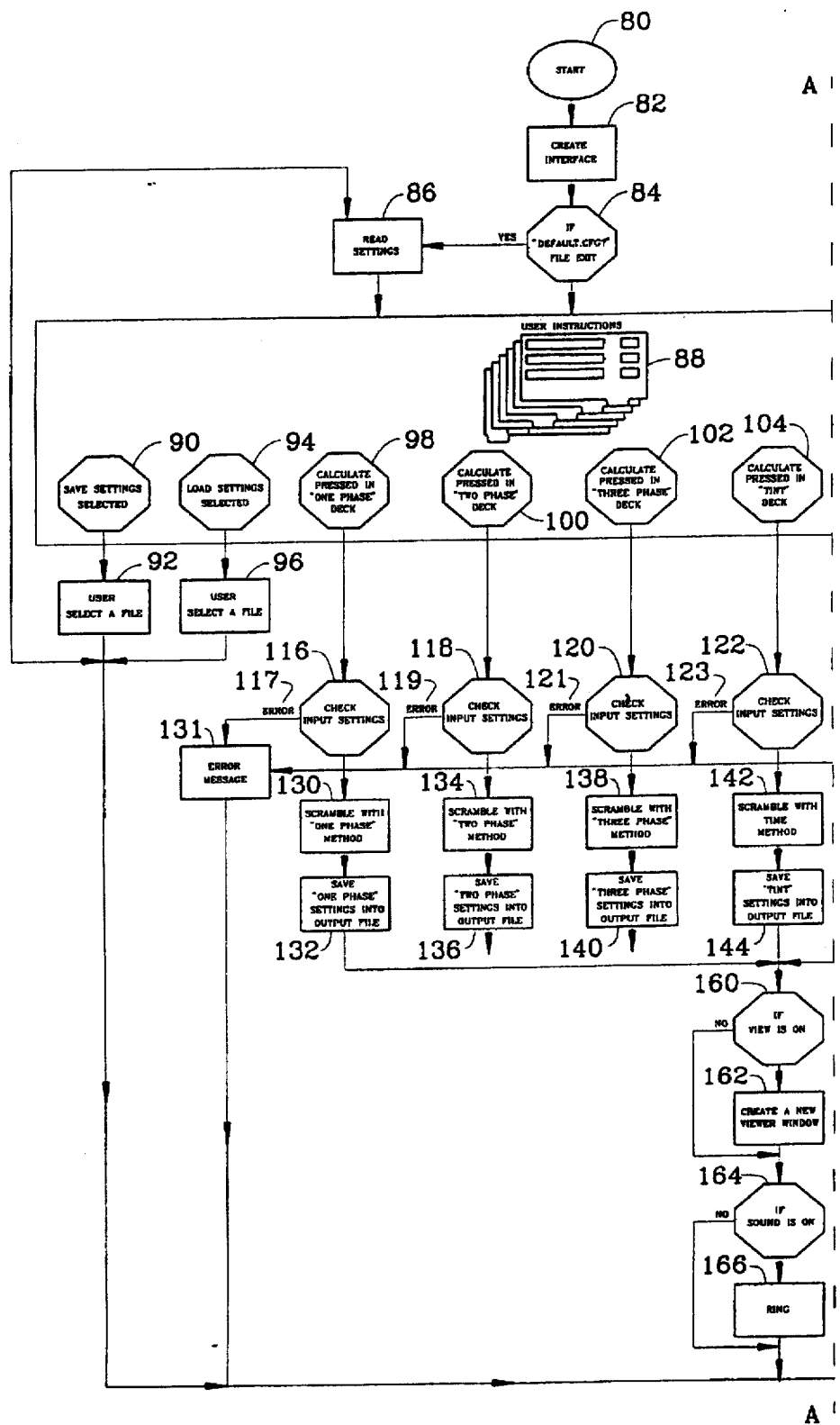
FIG. 12 is a flowchart of the same software.
Figure 12B:
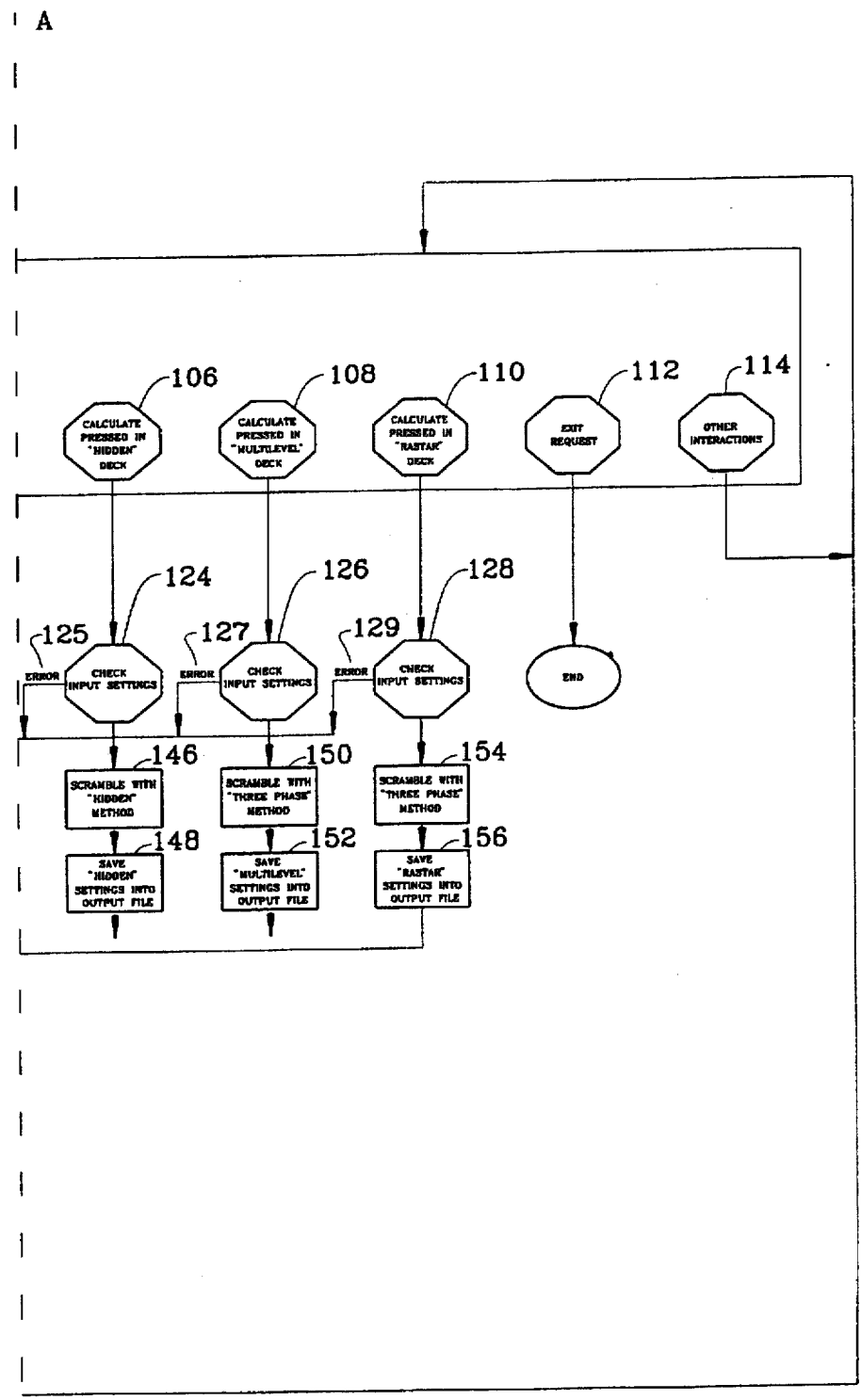

Referring now to FIG. 12, a flow chart of the overall operation of the S.I. Software is shown. Upon entering the program 80, a set of interface settings are either created 82, or read 86 from a default file 84. The user is then presented with a series of input screens for selecting the type of S.I. process to perform, along with the related parameters for performing such an operation. One option might be to save the settings already selected 90 into a user selected file 92. A related option would be to load settings already saved 94 into a user selected file 96.

As already described, the user might choose to perform a one, two, or three phase S.I. process. Accordingly, the user would indicate the appropriate source files on which to perform the S.I. process and indicate that such a one, two, or three phase calculation (shown as 98, 100, and 102) should be performed. Other S.I. operations which could be selected for calculation, would include a "tint" method 104, a "hidden" method 106, a "multilevel" method 108, and a "raster" method 110. Otherwise, the user might choose to exit the program 112, or re-enter the selection process 114.

Upon transitioning past the selection process, the program checks 166–128 the various input settings selected the user. The program detects errors 117–129 relating to each selection, and displays an appropriate error message 131 as appropriate. Based upon the input settings selected, the various operations will be performed, e.g. scramble with one phase method 130 and save the one phase results to an output file 132; scramble with two phase method 134 and save the two phase results to an output file 136; scramble with three phase method and save the three phase results to an output file 140; scramble with tint method 142 and save the tint method results to an output file 144; scramble with hidden method 146 and save the hidden results to an output file 148; scramble with multilevel method 150 and save the multilevel results to an output file 152; or scramble with raster method 154 and save the raster results into an output file 156. The results of any of these methods can then be displayed and viewed 160 (if desired) via a resulting viewer window 162. Tonal sound indicators 166 can also indicate the progress of the software if selected 164.

The S.I. software uses a variety of user interface screens which facilitates choosing which type of S.I. process will be performed, and under which parametric conditions. FIG. 13 shows the introductory screen upon entering the SIS program which shows the user the ownership rights associated with the program. The user interface for the SIS is based upon the "X window" environment. It is similar to most GUI (Graphical User Interfaces). When the user moves the mouse pointer to a choice field and holds the mouse button down, the user will get a pop down or pop up window. This window will allow the user to make even more choices.

FIG. 14 shows the basic user interface screen associated with performing an SI operation. When the user clicks on the File Menu option, File Menu option, the choices in FIG. 14(a) will appear (e.g. About SIS, Load Settings, Save Settings, Sound, and Quit). When the user chooses either load or save from the file menu, the screen in FIG. 14(b) will appear. The user may drag the slider bar 200 or click on the arrow keys 201 to move through the list of available files. Moreover, the user can use the directory bar buttons 202 to shift backwards in the shown directory hierarchy. The "filter" button 203 brings up another window 204 which allows the user to specify which type of files to view; for instance the "wildcard" designator "*" could be used with "*.tif" to bring up all "tif" files for possible selection from among the listed files. Once the desired file is found, the "OK" button 205 accepts and loads/saves the file. Either cancel button 206 ends the current operation.

Furthermore, if the user activates the Sound setting, the SIS program will provide verbal cues to let the user know what's going on; otherwise, the SIS program will remain silent during operation. The user can quit the SIS software at anytime by selecting quit, or executing an Alt-Q keystroke.

Referring again to FIG. 14, the "decoder" box 170 shows the type of decoder selected (e.g. D-7X). The "type" box shows the scramble type 176 selected (e.g. one phase S.I., two phase S.I., hidden image S.I., etc.). The "density" slider bar 172 allows the user to control the line weight of the image that is created during the encoding process. The feature will affect both the "positive" (darkened) and "negative" (white) space of the object being encoded. This value can be adjusted based upon what you are encoding and what the final print destination will be. The "base code" slider bar 174 allows the user to control the amount of scramble that is applied during the encoding stage, as described above. The "flip" box allows the user to turn each individual scrambled element by 180 degrees about its vertical axis. This option helps hide the original item when that item is of a simple enough nature to see even after the scramble. In other words, sometimes when scrambling a single word or a few characters, the letters are still discernable despite the scrambling process applied. By flipping the elements, a deeper scramble can often be achieved which can still be decoded by the same lens. Also, as mentioned before, flipping the elements often produces a sharper decoded character.

Figures 15, 15A:
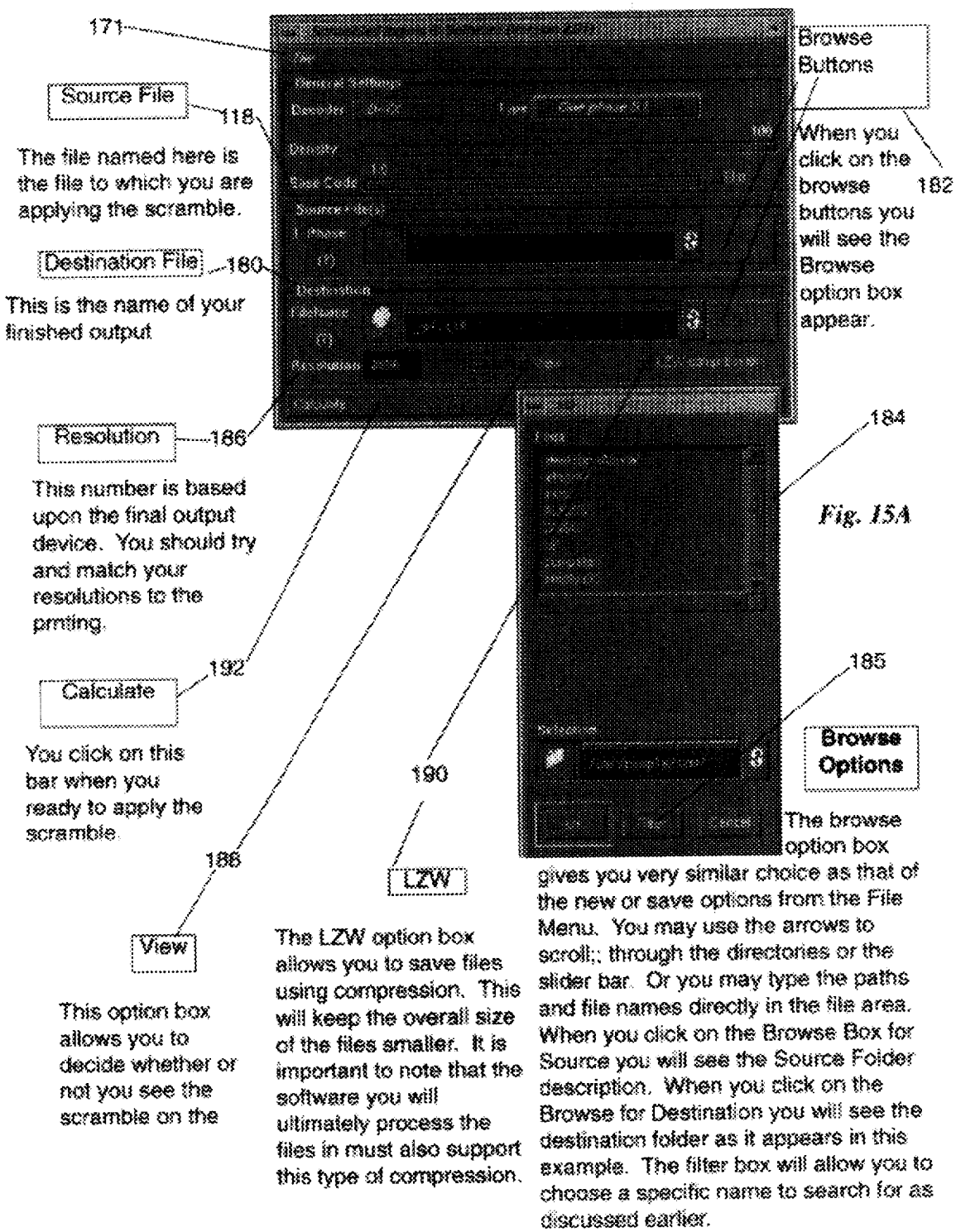
FIG. 15 shows and details further options of the generalized screen for a one phase SI selection.
FIG. 15(a) shows the Browse option screen as selected from the screen shown in FIG. 15.

FIG. 15 shows the same basic user interface screen with further explanations of user interface boxes. The "source file" box 178 allows the user to directly enter the file name to which the program is applying the scramble. The "destination file" box 180 allows the user to directly enter the name of the file for the finished output. Both the source file and destination file boxes have "browse" buttons 182 which pull up yet another box 184 (FIG. 15(a)) for selecting possible source and destination files. In the browse box, the user may use arrows, or the slider bar, to scroll through the file directories and locate and select a particular file. The "filter" box 185 allows the user to select a specific file name and have the program search for it. The "resolution" box 186 indicates the resolution of the final output image. This number should be matched to the resolution of the destination printing device. The "view" option box 188 allows the user to decide whether or not to see the scrambled image upon completion of the S.I. calculation. The "LZW" option box 190 allows the user to save files using compression. Compression keeps the overall size of the files smaller and conserves disk storage space. The "calculate" button 192 allows the user to click on this bar when ready to finally apply the S.I. scrambling process.

FIG. 16 shows a similar screen for performing a two phase S.I. operation. However, this screen provides entry boxes for two source files 210, where the latent images are interlaced into a two phased scrambled image. With the two phased example, the user can select a different base code for each image. This is especially useful when the user wants to create an overlay of two different sets of text that will be viewed together, yet be seen as separate words when decoded. A "restraint" option box 212 is provided for linking the first and second images together whereby the same base code will be applied to each image. The remainder of the options are similar to those described above.

Figure 17:
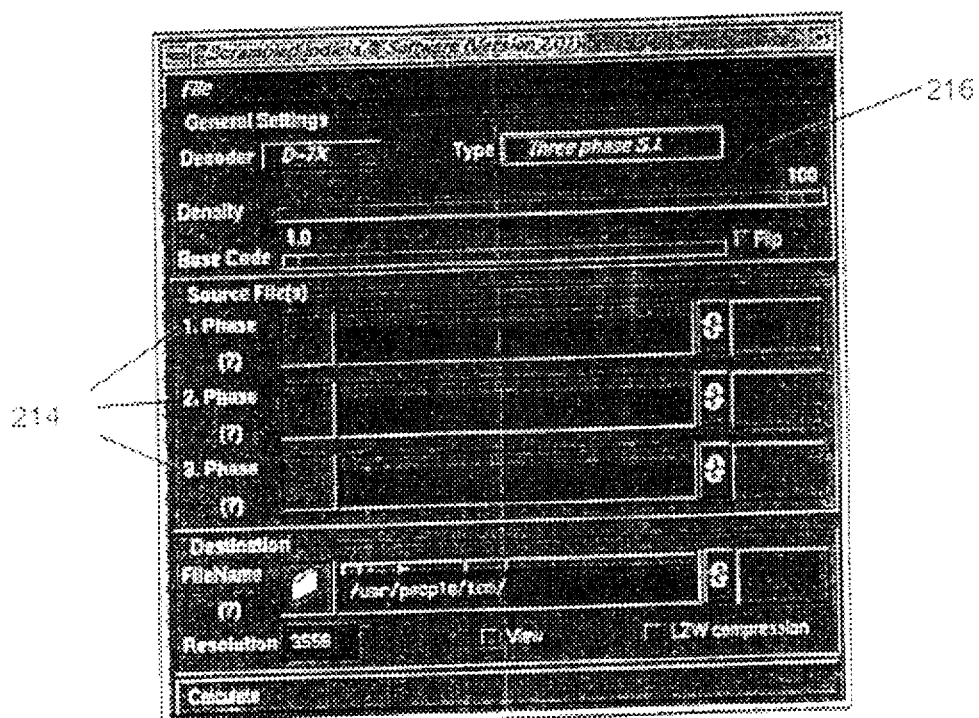
FIG. 17 shows the generalized screen for a three phase type SI selection.

FIG. 17 shows a similar screen for performing a three phase S.I. operation. This screen provides three source file input boxes 214 wherein each input image can have a different base code applied, or the same base code can be applied to all by activating the restraint option 216.

Figure 18:
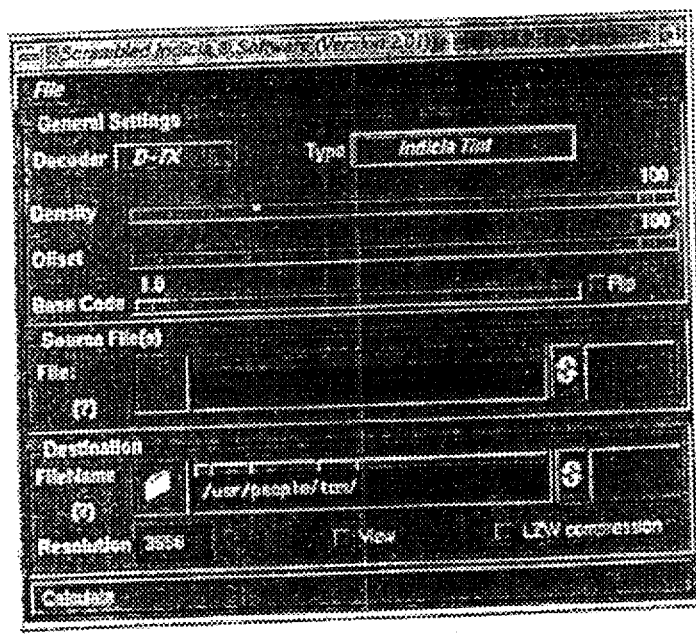
FIG. 18 shows the generalized screen for an indicia tint type SI selection.

Referring now to FIG. 18 the interface screen for performing an "indicia tint" operation is shown. Unlike the hidden image S.I. (below), the indicia tint will flow as smoothly as possible through the image, ignoring tonal variations. This image might be thought of as a "monotone scramble." Referring now to FIG. 18(a), an output image is shown (similar to FIG. 2) which is similar to a two phase S.I., but with only one input file. In this instance, every second sub-slice 222, 224 of the output image is the complimenter of the immediate previous input sub-slice. The complimenter means, for example, that when the input is black, the complimenter is white, if the input is red, the complimenter is cyan, etc.

Figure 19:
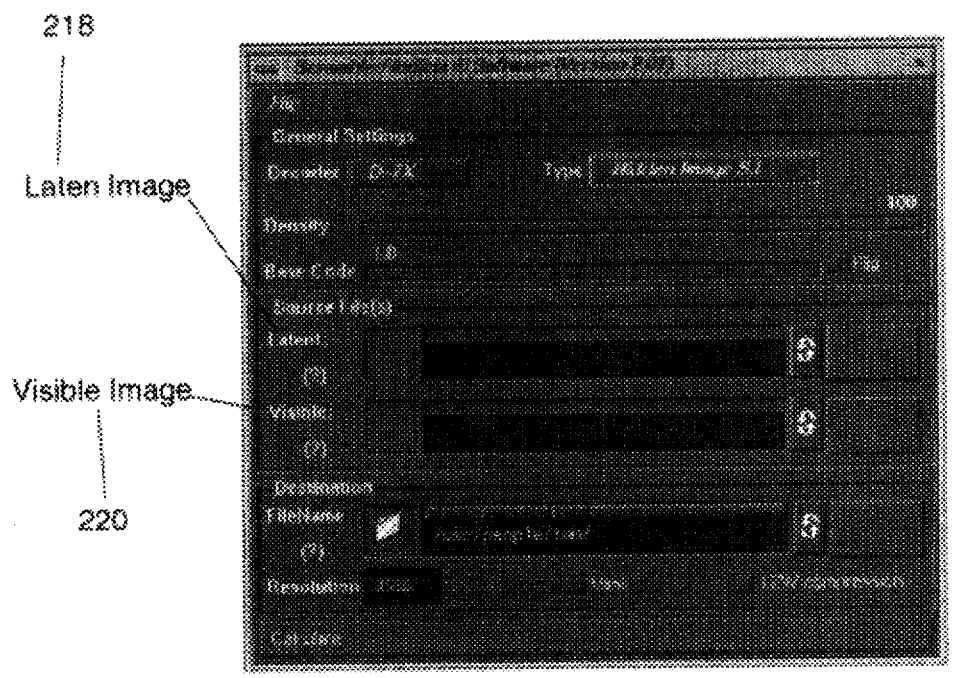
FIG. 19 shows the generalized screen for a hidden image type SI selection.

FIG. 19 shows the interface screen for a "hidden image" S.I. operation which provides input boxes for a latent image 218 and a visible image 220. This operation allows the user to mix two images together where one of the images becomes latent to the other which is visible. This effect will allow the latent image to be visible only when viewed through the decoder. Hidden image S.I. also allows use of an additional file to compensate for image offset. The hidden image S.I. is similar to the two phase S.I. (described above) and the indicia tint (below) except that the output background is a picture instead of white. The first step is to copy the visible image to the output image. After this, the method is similar to the indicia tint, but the density parameter controls the visibility of the image. Also, the hidden image technique is similar to the S.I. Raster (below), but a bitmap (single color) image is used instead of a grey scale image.

FIG. 20 shows the user interface screen for multilevel S.I. operation. The multilevel S.I. creates a scrambled image that contains a sense of depth perception. This type of scramble allows the user to set both a minimum base code 226 and a maximum base code 228. This particular version of the SIS program uses two images, one image called the texture image 222 and another called a depth image 224. During encoding, the tonal values of the depth image elements will cause a scrambling variant in the elements of the texture image. This variant will give the decoded image the illusion of depth, hence the name multilevel S.I.

For example, this multilevel technique can simulate a 3-dimensional ("3-D") camera effect by placing a face in the depth image and applying less base code, while flipping the elements for added sharpness. The background would be placed in the texture file which would have more base code applied for more scrambling effect, and with no flipping of the elements. By superimposing these two scrambled images upon each other, the decoded face would appear to be sharper and have more depth than the surrounding background. Hence the face would appear to "float", thereby creating a 3-D effect.

Referring now to FIG. 21, the interface screen for an S.I. Raster operation is shown. The S.I. Raster allows the user to mix two images together where one of the images becomes latent 230 to the other which is visible 232. The latent image will interlace with the visible image following the grey scale values of that image. This effect will allow the latent image to be visible only when viewed through a decoder. Additionally, the latent image might consist of a one, two, or three multi-phased image as created using previous interface screens for multi-phased images and saved in an appropriate file.

One of the most useful applications for the S.I. Rastering technique is where the visible image is a photograph and the latent image might be a signature of that person. Using the SIS program, the visible image can be rasterized and then the signature image can be scrambled and merged into the visible image raster pattern. The resulting encoded image will be a visible image of a person's photograph, which when decoded will reveal that person's signature. The latent image might include other vital statistics such as height, weight, etc. This high security encoded image would prove to be extremely useful on such items as passports, licenses, photo ID's, etc.

Figure 22:
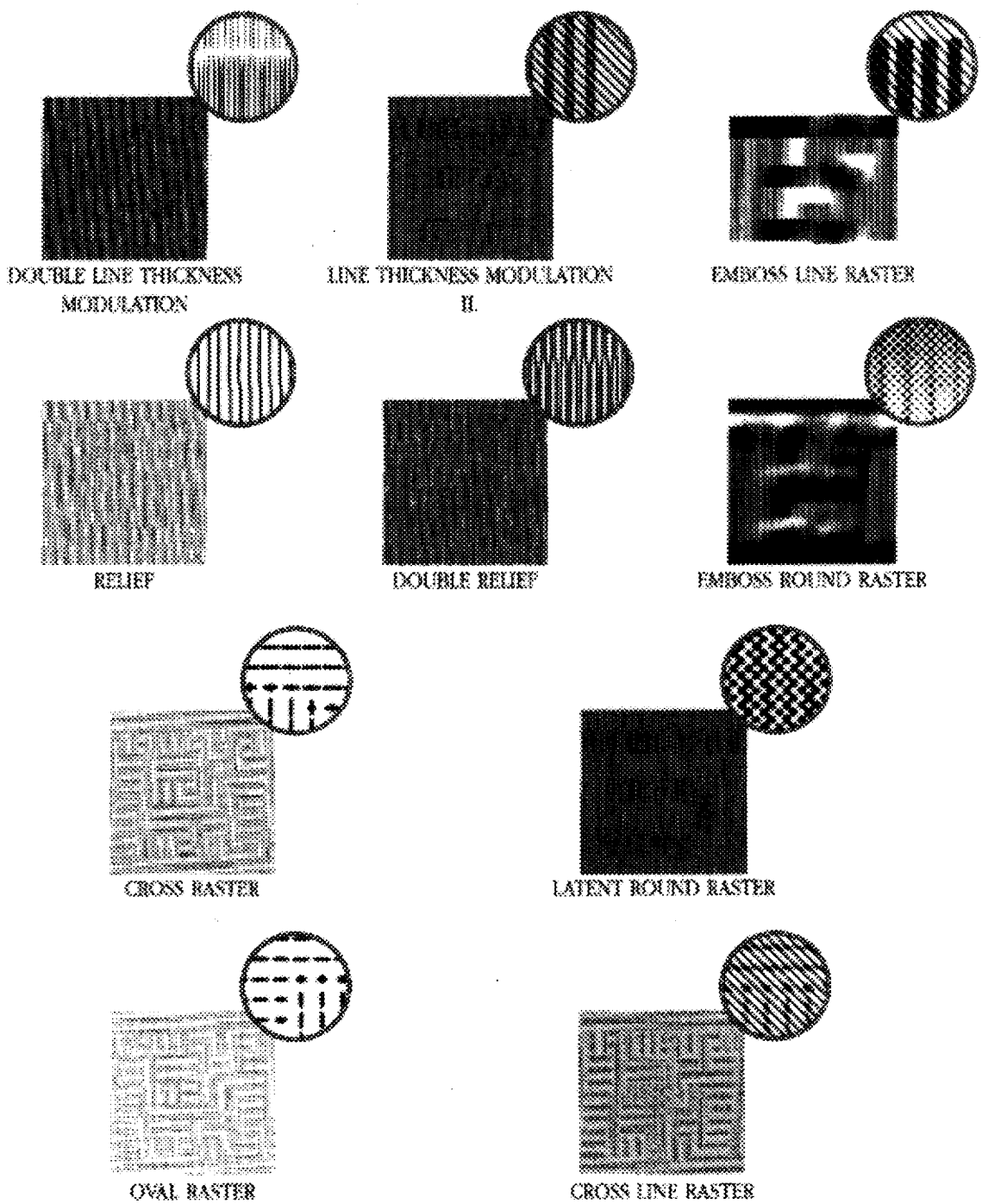
FIG. 22 shows examples of rastering techniques with the accompanying circles indicating an enlarged view of a portion of the overall pattern.

The processes described above have used line rastering techniques as derived from the suggested lenticular structure of the decoding lens. Other rastering techniques might also be used, which would be accompanied by corresponding decoder lenses capable of decoding such rastered and scrambled patterns. Referring now to FIG. 22, a series of example rastering techniques are shown which could similarly be used to encode scrambled images into rasterized visible source images. Accompanying each type of rastering is a circle showing an enlarged portion of the raster. The example types include: double line thickness modulation; line thickness modulation II; emboss line rastering; relief; double relief; emboss round raster; cross raster; latent round raster; oval raster; and cross line raster. Another technique, cross embossed rastering, might use one frequency of lens density on the vertical plane and yet another frequency on the horizontal plane. The user would then check each latent image by rotating the lens. Yet another technique would include lenses which varying in frequency and/or refractive characteristics across the face of a single lens. Hence different parts of the printed matter could be encoded at different frequencies and still be decoded by a single lens for convenience. Undoubtedly many other rastering types exist which are easily adaptable to the SIS encoding techniques.

Regardless of the type of rastering used, a variety of other security measures could be performed using the SIS program and the underlying principles involved. For instance, the consecutive numbering system found on tickets or money might be scrambled to insure further security against copying. The SIS program might also digitally generate scrambled bar encoding. A Method and Apparatus For Scrambling and Unscrambling Bar Code Symbols has been earlier described in this inventors U.S. Pat. No. 4,914,700, the principles of which are hereby incorporated by reference.

Yet another common security printing technique includes using complex printed lines, borders, guilloches, and/or buttons which are difficult to forge or electronically reproduce. The SIS program can introduce scrambled patterns which follow certain lines on the printed matter, hence the inventor refers to this technique as Scrambled Micro Lines.

The security of the Scrambled Indicia might be further enhanced by making 3 color separations in Cyan, Magenta, and Yellow of the image after the S.I. process has been performed. These colors would then be adjusted to each other so that a natural grey could be obtained on the printed sheet when the colors are recombined. The inventor refers to this process as "grey match." Hence, while the printed image would appear grey to the unaided eye, the decoded image would appear in color. The adjustment of the separations to maintain a neutral grey becomes yet another factor to be controlled when using different combinations of ink, paper, and press. Maintaining these combinations adds another level of security to valuable document and currency.

Still another possible use of the SIS program would be to create interference, or void tint, combinations on printed matter. This technique will conceal certain words, like "void" or "invalid" on items such as concert tickets. If the ticket is photocopied, the underlying word "void" will appear on the copy and hence render it invalid to a ticket inspector. The SIS software would provide an efficient and low cost alternative to producing such void tint patterns.

The SIS program might also be adapted to produce watermark-type patterns which are typically introduced to paper via penetrating oil or varnish. Furthermore, the SIS program might be applicable to producing holograms via line diffraction methods. Again, the SIS program would prove to be more efficient and cost effective for producing such results.

It is to be understood that while I have illustrated and described certain forms of my invention, it is not to be limited to the specific forms or arrangement of parts herein describe and shown. It will be apparent to those skilled in the art that various changes may be made without departing from the scope of the invention and the invention is not to be considered limited to what is shown in the drawings and described in the specification.

What is claimed is:

1. A method as implemented on a computer system for digitally producing counterfeit-deterring encrypted indicia for incorporation on printed matter, said method comprising the steps of:

(i) scrambling of a input image, which has been digitized and divided into a first number of elemental input line segments, each line segment having an axis, said input line segments being scrambled as a function of a user specified factors including a lens density factor means for selecting the type of decoder lens to be used, a means for specifying the degree of scrambling to be applied to said input line segments, a doubling factor option means for doubling the number of elemental input line segments, and a flipping option means for rotating said input line segments about said axes, said scrambling operation resulting in said first number of scrambled elemental output segments; and (ii) digitization and rasterization a visible source image into segments equal in number to said first number of said resulting scrambled elemental output segments; and (iii) merging of said rasterized visible source image segments with said scrambled elemental output segments to form an encrypted output image so that the resulting encrypted output image is formed to show said visible image while retaining the underlying encrypted pattern of said scrambled input image; and (iv) printing said encrypted output image with sufficient resolution so that a decryption means reveals said scrambled input image.

2. The method of claim 1, wherein said visible source image is digitized and converted into a grey scale image with tonal variations over a set of component colors.

3. The method of claim 2, wherein said component colors are further divided into individual color plates whereby each color plate is individually rasterized and a different latent image is scrambled and incorporated into each color plate, whereby the final output image is the result of recombining the encrypted and non-encrypted component color plates.

4. The method of claim 1, wherein said scrambled input image consists of a single latent image which has been segmented and scrambled as a function of said user specified scrambling factors.

5. The method of claim 1, wherein said rasterized visible source image segments are further halved into odd and even sub-segments, and said scrambled input image consists of two latent images, each of which have been segmented into said first number of elements one-half the width of said source image segments and scrambled as a function of said user specified scrambling factors for each image into scrambled elemental output segments for each input image, and wherein said scrambled elemental output segments of said first image are interlaced into every even sub-segment of said visible source image, and said scrambled elemental output segments of said second image are interlaced into every odd sub-segment of said visible source image.

6. The method of claim 1, wherein said rasterized visible source image segments are further divided into first, second, and third sub-segments, and said scrambled input image consists of three latent images, each of which have been segmented into said first number of elements one-third the width of said source image segments and scrambled as a function of said user specified scrambling factors for each image into scrambled elemental output segments for each input image, and wherein said scrambled elemental output segments of each first, second, and third input image are interlaced into every first, second, and third respective sub-segment of said visible source image.

7. The method of claim 1, wherein said rasterized visible source image segments are further divided into a second number of sub-segments, and said scrambled input image consists of a plurality of latent images, each of which have been segmented into said first number of elements with a width equal to the fractional portion of one divided by said second number and scrambled as a function of user specified scrambling factors for each image into scrambled elemental output segments for each input image, and wherein said scrambled elemental output segments of each latent image are sequentially interlaced into their respective visible source image sub-segment.

8. The method of claim 1, wherein said rasterized visible source image segments are further divided into odd and even sub-segments, and said scrambled image consists of a first latent image, which has been segmented into said first number of elements one-half the width of said source image segments and scrambled as a function of user specified scrambling factors into scrambled elemental output segments, and wherein said scrambled elemental output segments of said first image are interlaced into every odd sub-segment of said visible source image, and said even sub-segments are the complimenter of said previous odd sub-segments.

9. The method of claim 1, wherein said visible source image consists of a tint pattern with a scrambled latent image incorporated therein, with said encrypted output image segments flipped 180 degrees about said axes, but flipped only in the portion of said segment where a letter or object occurs due to the incorporated latent image.

10. The method of claim 1, wherein said scrambled input image is incorporated directly into a predominate feature of said visible source image, thereby creating a latent image which appears hidden directly behind said predominate visible feature when decoded and viewed.

11. The method of claim 1 wherein said visible source image is digitized and converted into a single color bitmap image.

12. The method of claim 1, wherein a multi-leveled, 3-dimensional effect is created by using scrambled input image comprised of a background pattern which is more scrambled than a second image of a foreground object, said overall scrambled input image being incorporated into said visible image, where upon decryption, said foreground object appears dimensionally distinct from said background pattern.

13. An apparatus for implementing the method of claim 1, including a scanner for digitizing images, a high speed computer for running a software program for performing said method of claim 1, said computer also processing and displaying high resolution graphics, a second high resolution graphical computer for finalizing said resulting encoded output images, and a high resolution printing device for printing said resulting encoded output images.

14. A method as implemented on a computer system for digitally producing counterfeit-deterring encrypted indicia for incorporation on printed matter, said method comprising the steps of:

(i) scrambling of a input image, which has been digitized and divided into a number of elemental input line segments, each line segment having an axis, said input line segments being scrambled as a function of a user specified factors including a lens density factor means for selecting the type of decoder lens to be used, a means for specifying the amount of scrambling to be applied to said input line segments, a doubling factor option means for doubling the number of elemental input line segments, and a flipping option means for rotating said input line segments about said axes, said scrambling operation resulting in said number of scrambled elemental output segments;

(ii) digitization and rasterization a visible source image into segments equal in number to said number of said resulting scrambled elemental output segments;

(iii) merging of said rasterized visible source image with said scrambled elemental output segments to form an encrypted output image so that the resulting encrypted output image is formed to show said visible image while retaining the underlying pattern of said scrambled input image;

(iv) separating said encrypted output image into component colors and adjusting each component color so that when recombined, said component colors will produce a greyish tone;

(v) recombining said component colors into a grey colored encrypted output image;

(vi) printing said encrypted output image with sufficient resolution so that a decryption means reveals the scrambled, colored input image.

* * * * *

UNITED STATES PATENT AND TRADEMARK OFFICE
Certificate

Patent No. 5,708,717                                          Patented: January 13, 1998

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Alfred V. Alasia, Lake Worth, FL (US); Thomas C. Alasia, Wellington, FL (US); and Alfred J. Alasia, Royal Palm Beach, FL (US).

Signed and Sealed this Fifth Day of October 2010.

<div style="text-align:right">

WILLIAM R. KORZUCH
*Supervisory Patent Examiner*
Art Unit 2431
Technology Center 2400

</div>